(12) United States Patent
Beck et al.

(10) Patent No.: US 10,019,413 B2
(45) Date of Patent: Jul. 10, 2018

(54) SYSTEMS, METHODS, AND COMPUTER-READABLE MEDIA FOR PROVIDING A DYNAMIC LOUPE FOR DISPLAYED INFORMATION

(71) Applicant: Apple Inc., Cupertino, CA (US)

(72) Inventors: Nils Beck, San Mateo, CA (US); Conrad Carlen, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 465 days.

(21) Appl. No.: 13/966,318

(22) Filed: Aug. 14, 2013

(65) Prior Publication Data

US 2013/0332820 A1 Dec. 12, 2013

Related U.S. Application Data

(63) Continuation of application No. 12/907,871, filed on Oct. 19, 2010, now Pat. No. 8,522,158.

(51) Int. Cl.
*G06F 17/00* (2006.01)
*G06F 17/21* (2006.01)
*G06F 3/0484* (2013.01)

(52) U.S. Cl.
CPC .......... *G06F 17/212* (2013.01); *G06F 3/0484* (2013.01); *G06F 2203/04805* (2013.01); *G06F 2203/04806* (2013.01)

(58) Field of Classification Search
CPC ...... G06F 17/212; G06F 17/24; G06F 3/0484; G06F 2203/04805; G06F 2203/04806
See application file for complete search history.

(56) References Cited

U.S. PATENT DOCUMENTS

| 6,456,745 | B1 * | 9/2002 | Bruton | G06T 3/4084 |
| | | | | 382/276 |
| 6,704,034 | B1 | 3/2004 | Rodriguez et al. | |
| 7,551,187 | B2 * | 6/2009 | Agrawala | G06F 17/241 |
| | | | | 715/203 |
| 7,900,158 | B2 | 3/2011 | Ngari et al. | |
| 8,319,801 | B2 | 11/2012 | Cragun et al. | |
| 8,514,460 | B2 * | 8/2013 | Miyagawa | H04N 1/00002 |
| | | | | 358/448 |
| 8,522,158 | B2 | 8/2013 | Beck et al. | |

(Continued)

OTHER PUBLICATIONS

Cockburn et al., A Review of Overview+Detail, Zooming, and Focus+Context Interfaces, AMC Computing Surveys, vol. 41, No. 1, Article 2, Publication date: Dec. 2008 (Year: 2008).*

(Continued)

*Primary Examiner* — Chau T Nguyen
(74) *Attorney, Agent, or Firm* — Invoke

(57) ABSTRACT

Systems, methods, and computer-readable media are provided for providing a dynamic loupe for displayed information of a document. The displayed information can be provided in various sub-regions of the document. Based on the position of an input relative to a particular sub-region, the loupe can be sized and positioned such that a portion of information from the sub-region is displayed in the loupe. The portion of information can be displayed using a loupe scale factor that may differ from a scale factor used for the rest of the displayed information. The loupe position can be selected such that the contents and or position of the loupe may be biased towards a particular sub-region.

20 Claims, 35 Drawing Sheets

(56) References Cited

U.S. PATENT DOCUMENTS

| | | | |
|---|---|---|---|
| 8,749,587 B2* | 6/2014 | Chiu | G06K 9/00456 345/667 |
| 2002/0171690 A1 | 11/2002 | Fox et al. | |
| 2004/0075671 A1* | 4/2004 | Vale | G09G 5/005 345/660 |
| 2006/0227153 A1* | 10/2006 | Anwar | G06T 3/0012 345/660 |
| 2007/0033544 A1 | 2/2007 | Fleisher et al. | |
| 2007/0083826 A1* | 4/2007 | Pessetto | G06F 17/50 715/800 |
| 2007/0268317 A1 | 11/2007 | Banay | |
| 2008/0238947 A1 | 10/2008 | Keahey et al. | |
| 2009/0189920 A1* | 7/2009 | Chiu | G06K 9/00456 345/662 |
| 2010/0026723 A1 | 2/2010 | Nishihara et al. | |
| 2010/0083186 A1 | 4/2010 | Zaman | |
| 2010/0165014 A1* | 7/2010 | Wu | G09G 5/391 345/698 |
| 2010/0194784 A1* | 8/2010 | Hoff | G06F 3/0488 345/661 |
| 2011/0141031 A1* | 6/2011 | McCullough | G06F 3/0481 345/173 |
| 2012/0096343 A1 | 4/2012 | Beck et al. | |

OTHER PUBLICATIONS

"U.S. Appl. No. 12/907,871, Response filed Sep. 25, 2012 to Non Final Office Action dated May 25, 2012", 12 pgs.

"U.S. Appl. No. 12/907,871, Examiner Interview Summary dated Mar. 21, 2013", 3 pgs.

"U.S. Appl. No. 12/907,871, Final Office Action dated Jan. 16, 2013", 25 pgs.

"U.S. Appl. No. 12/907,871, Non Final Office Action dated May 25, 2012", 21 pgs.

"U.S. Appl. No. 12/907,871, Notice of Allowance dated Apr. 29, 2013", 13 pgs.

"U.S. Appl. No. 12/907,871, Response filed Mar. 15, 2013 to Final Office Action dated Jan. 16, 2013", 12 pgs.

"U.S. Appl. No. 12/907,871, Response filed Apr. 16, 2013 to Final Office Action dated Jan. 16, 2013", 11 pgs.

"Lunar Screen Magnifier Version 11.0", Dolphin Oceanic Ltd., (Apr. 2009), 196.

"U.S. Appl. No. 12/907,871, Advisory Action dated Mar. 28, 2013", 3 pgs.

* cited by examiner

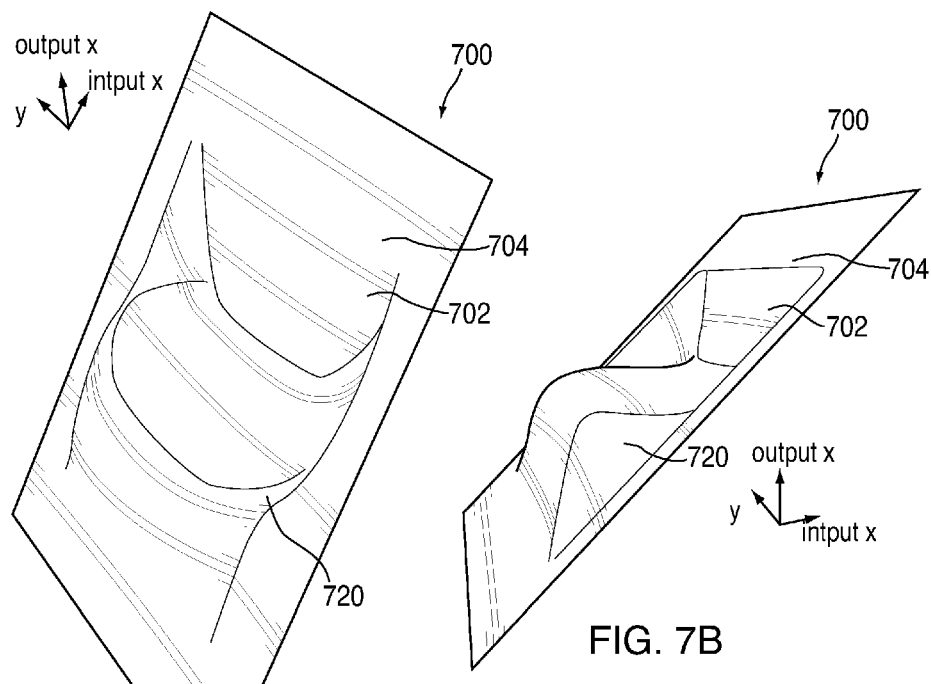
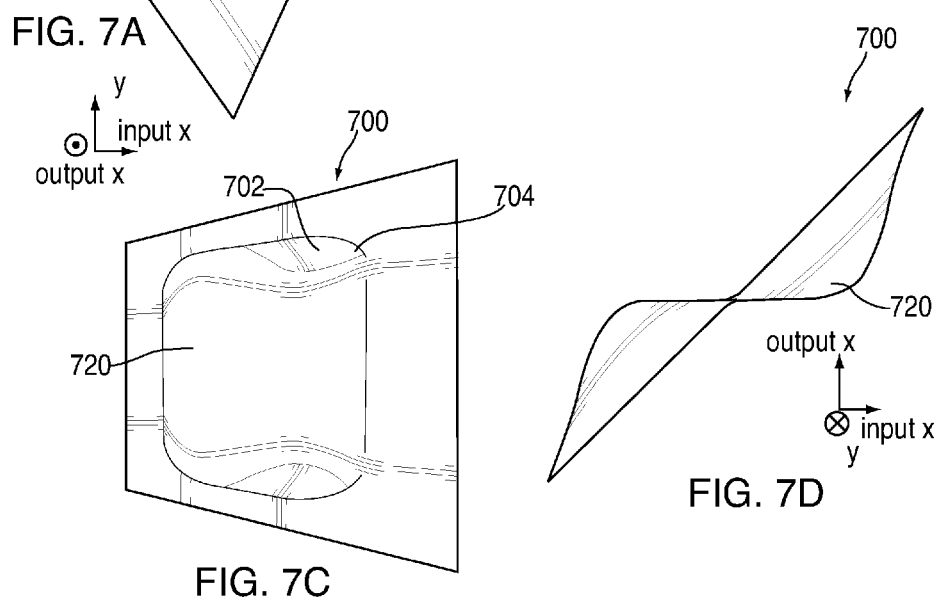
FIG. 7A
FIG. 7B
FIG. 7C
FIG. 7D

SYSTEMS, METHODS, AND COMPUTER-READABLE MEDIA FOR PROVIDING A DYNAMIC LOUPE FOR DISPLAYED INFORMATION

CLAIM OF PRIORITY

This patent application claims the benefit of priority of U.S. patent application Ser. No. 12/907,871, filed on Oct. 19, 2010, which is hereby incorporated by reference herein in its entirety.

BACKGROUND

Some electronic devices can be used to display information to a user. For example, some electronic devices can display documents or other content on a display. Displayed information can be provided in one of several sizes, as determined from a scale factor applied to the information. In some cases, a scale factor used can be very small, such that it is difficult for a user to decipher some of the displayed information. Instead of forcing a user to re-scale all of the displayed information, some devices can allow users to overlay a fixed-size magnification tool or loupe over the displayed information so that portions of the information located in a region underneath the loupe are magnified (e.g., the portions are displayed with a larger scale factor). However, such loupes are generally provided without respect to the type of information they are magnifying, and have a single shape (e.g., a circle).

SUMMARY

Systems, methods, and computer-readable media for providing a dynamic loupe for displayed information are provided.

An electronic device can display information in a window of a device. For example, a content view module can provide the information to be displayed. In some cases, the electronic device can provide a magnification tool, such as a loupe, by which portions of the displayed information can be magnified. The loupe can have a variable size such that the size of the loupe may be determined from the particular portions of the displayed information being magnified. For example, the electronic device can identify an input position (e.g., a cursor location), and identify dimensions associated with a sub-region adjacent to the input position. In particular, the electronic device can identify columns, boxes, or other sub-regions of a document in which information is provided. The portions of information that are adjacent to the input position can be displayed in the loupe.

As the device detects different input positions, the size of the loupe can change in addition to the particular information provided in the loupe. For example, the electronic device can determine that information adjacent to a new input position is associated with new dimensions. The electronic device can then dynamically re-size the loupe to correspond to the information adjacent to the new input position.

The loupe can be placed in any suitable position over displayed information. In some cases, the electronic device can define a loupe position offset from the position of a detected input, such that the loupe may be substantially centered with respect to a sub-region in which information is displayed. As the input position moves towards boundaries of the sub-region, the loupe may progressively be displaced from a center of the sub-region.

In some cases, the electronic device can change a scale factor at which information is displayed within the loupe. For example, a user can change a magnification scale factor associated with the loupe. When the scale factor of the loupe changes, the loupe may be re-sized to accommodate the change in scale factor. In addition, the electronic device can automatically scroll displayed information in response to receiving an instruction to move a loupe past a boundary of displayed information. The particular information displayed in the loupe can correspond to the scrolled information provided underneath the loupe.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which:

FIGS. 7A-7D are graphical representations of an algorithm that may be used to associate a loupe position with an input position in accordance with some embodiments of the invention;

DETAILED DESCRIPTION

Systems, methods, and computer-readable media for providing a dynamic loupe for displayed information are provided and described with reference to FIGS. 1-22.

Figure 1:
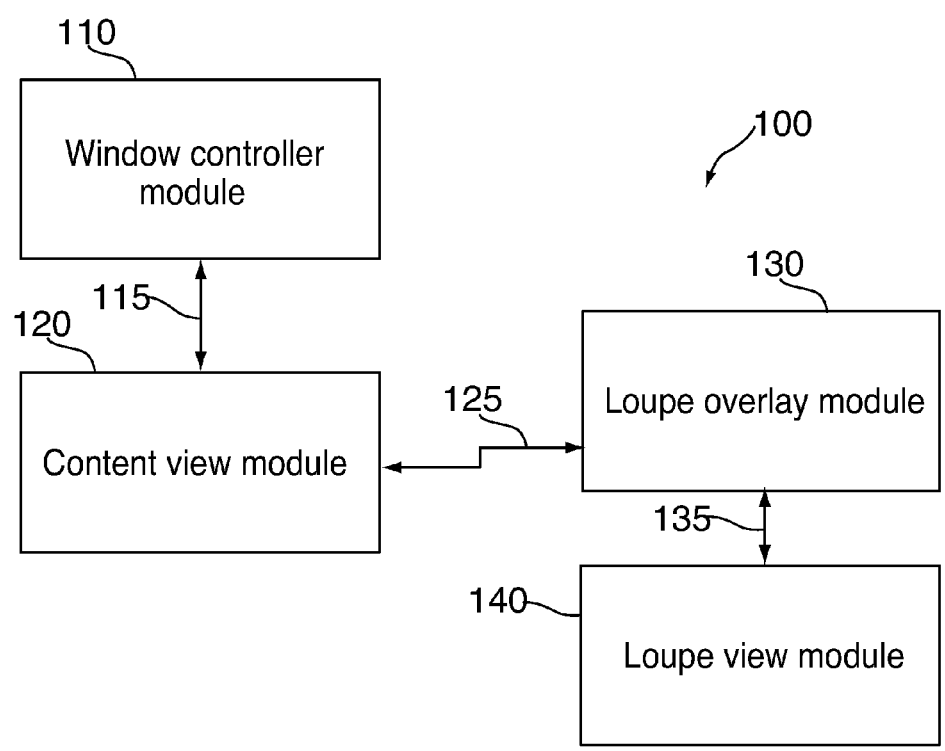
FIG. 1 is a schematic diagram of modules that may be used to display information and a loupe in accordance with some embodiments of the invention.

An electronic device can display information in one or more windows of a display. Alternatively, an electronic device can display information in any other type of resizable canvas or region on a display. For the sake of simplicity, however, the following discussion will describe embodiments in the context of a window in which information may be provided. FIG. 1 is a schematic diagram of modules that may be used to display information and a loupe in accordance with some embodiments of the invention. Electronic device 100 can include several modules that may be interconnected via application program interfaces ("APIs"), such that the modules can share or transfer information. In particular, electronic device 100 can include a window controller module 110 that may be operative to control the display of content on a display. For example, window controller module 110 can define the position and size of individual windows, or can establish a depth order for different displayed information.

Electronic device 100 may include a content view module 120 that can provide content or information for display in a window provided by window controller module 110. For example, content view module 120 can retrieve particular information to display to the user. The information can include, for example, text, images, videos, media, glyphs, graphics, or other content that may be displayed to a user. The displayed information can be formatted by content view module 120 to have any suitable appearance. For example, content view module 120 can define several sub-regions in a document, where different portions of the information may be provided in each sub-region. The sub-regions can include, for example, columns of different sizes, text boxes, inset regions, image boxes, or combinations of these. The sub-regions can have any suitable size including, for example, rectangles, triangles, circles, ellipses, polygons, curved shapes, or combinations of these. Content view module 120 can display particular information in each sub-region using any suitable scale factor, where a scale factor describes a displayed size of information relative to a size of the actual information (e.g., determined from a resolution or dimensions of the information). In some cases, information provided in different sub-regions can be provided with different scale factors, such that the information in specific sub-regions may be more difficult for a user to discern. Alternatively, the information displayed may be provided with a single, information scale factor, but individual portions of the information may be smaller than other portions of the information (e.g., a particular side bar or graphic may have a smaller font or scale factor than a primary text element provided in a column).

In some cases, a user may wish to view a portion of displayed information using an enlarged view without changing the information scale factor of the displayed information. In such cases, the electronic device can overlay a loupe or magnifying tool on the displayed information. The loupe can include a portion of information having a loupe scale factor that may be larger than the information scale factor of the displayed information. Electronic device 100 can include loupe overlay module 130 and loupe view module 140 for generating a loupe and populating the loupe with a portion of the displayed information provided by content view module 120. Loupe overlay module 130 can be operative to generate an overlay in which the particular portion of information is to be provided. In particular, loupe overlay module 130 can determine dimensions for the loupe, as well as the position of the loupe relative to the displayed information. In some cases, loupe overlay module 130 can call content view module 120 to retrieve the particular information to display in the loupe as loupe information, and can call loupe view module 140 to format and display the retrieved loupe information in the loupe. In this implementation, content view module 120 can receive a loupe scale factor and loupe dimensions from loupe overlay module 130, and can determine, on behalf of loupe view module 140, the particular portion of the displayed information to be display in the loupe as the loupe information.

Electronic device 100 can include one or more communications paths between each of modules 110, 120, 130, and 140, although only some paths may be shown in FIG. 1. In particular, electronic device 100 can include a path 115 between window controller module 110 and content view module 120, a path 125 between content view module 120 and loupe overlay module 130, and a path 135 between loupe overlay module 130 and loupe view module 140. The paths can include any suitable physical or virtual path including, for example, API calls between modules.

Figure 2:
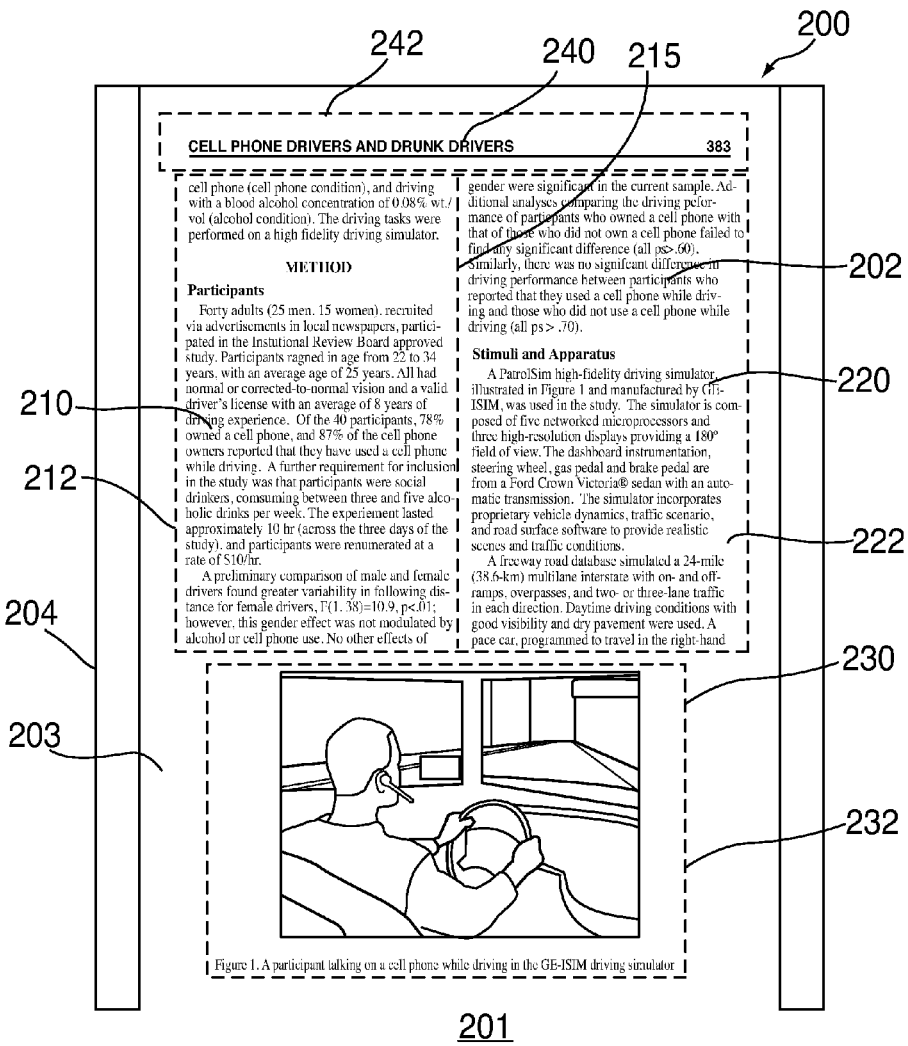
FIG. 2 is an illustrative electronic device display of information in accordance with some embodiments of the invention.

Electronic device 100, using one or more of the modules described in connection with FIG. 1, can display any suitable information. For example, electronic device 100 can display information as part of a portable document format ("PDF") file document. FIG. 2 is a schematic view of an illustrative electronic device display 200 of information in accordance with some embodiments of the invention. Display 200 of electronic device 201 can include different types of information 202 provided within window 204. In some cases, information 202 can be provided as part of document 203 displayed in window 204. Information 202 can include, for example, text, images, graphics, or other content.

Information 202 can be distributed in document 203 using any suitable approach. In some cases, document 203 can include one or more sub-regions in which information 202 can be provided. For example, document 203 can include sub-region 210 that may correspond to a first column and sub-region 220 that may correspond to a second column.

Document 203 can include sub-region 230 that may display an image, and sub-region 240 that may provide a title bar for information 202. Each sub-region can be identified by a boundary, where some of the boundaries can be shared between sub-regions. For example, sub-region 210 can include boundary 212 and sub-region 220 can include boundary 222, where portions of boundaries 212 and 222 may overlap (e.g., along a column divider 215). Similarly, sub-region 230 can include boundary 232 and sub-region 240 can include boundary 242. Electronic device 201 can automatically identify the sub-regions in which information is displayed using any suitable approach including, for example, using a process for analyzing documents (e.g., a process for determining how to construct PDF documents). The sub-regions can have any suitable shape including, for example, rectangular, triangular, polygonal, circular, elliptical, or curved shapes.

The particular information 202 displayed in each sub-region can have a same or different scale factor relative to the information displayed in other sub-regions. For example, a font size used for text in sub-regions 210 and 220 can be larger than a font size used for a photo caption in sub-region 230. Because the portions of information 202 provided in each sub-region are part of document 203 (e.g., information 202 is considered a total entity), however, information 202 can be associated with an information scale factor that applies to all displayed information 202 of document 203. Accordingly, to discern a portion of information 202 in a particular sub-region in which the portion of information may be sized too small to be easily read, a user may be forced to increase the information scale factor associated with all of information 202. This may be confusing or burdensome for a user, especially for reviewing ancillary portions of information 202.

Instead of requiring a user to increase an information scale factor for all displayed information, an electronic device can provide a loupe overlay in which portions of displayed information in a region adjacent to the loupe can be displayed at a loupe scale factor larger than the information scale factor for all the displayed information. FIGS. 3A-3D are illustrative electronic device displays 300 of successive positions of loupe 350 overlaid on a display in accordance with some embodiments of the invention. Display 300 of electronic device 301 can include information 302 of document 303 provided on the display. In some cases, information 302 can correspond to information 202 of FIG. 2, and can be distributed in a similar manner (e.g., in similar sub-regions). A user can direct electronic device 301 to display loupe 350 using any suitable approach. For example, a user can provide an instruction associated with enabling loupe 350 using an input interface.

In response to receiving a corresponding instruction, electronic device 301 can display loupe 350. Loupe 350 can be placed at any suitable position at least partially within window 304 of display 300. In some cases, loupe 350 can be positioned relative to a position of a detected input. For example, loupe 350 can be substantially centered about a position of user input cursor 360. In some cases, electronic device 301 can offset the loupe position from a position of a detected user input. The loupe can be positioned at a loupe position (e.g., based on a center of a loupe overlay window) determined from a position of an input (e.g., based on a mouse position). The particular information provided in the loupe can be determined from a center of magnification (e.g., information located around the center of magnification is displayed in the loupe). In most cases, the center of magnification can correspond with the position of the loupe.

In some cases, however, such as when the loupe would extend beyond the bounds of display 300 or of window 304, the loupe position and the center of magnification can be disassociated. In most of the following discussion, however, it may be assumed that the loupe position and the center of magnification are the same. The loupe position and size can be adjusted by loupe overlay module 130 (FIG. 1), while the center and area of magnification can be adjusted by content view module 120 (FIG. 1) based on settings for the center and area of magnification.

Figure 3A:
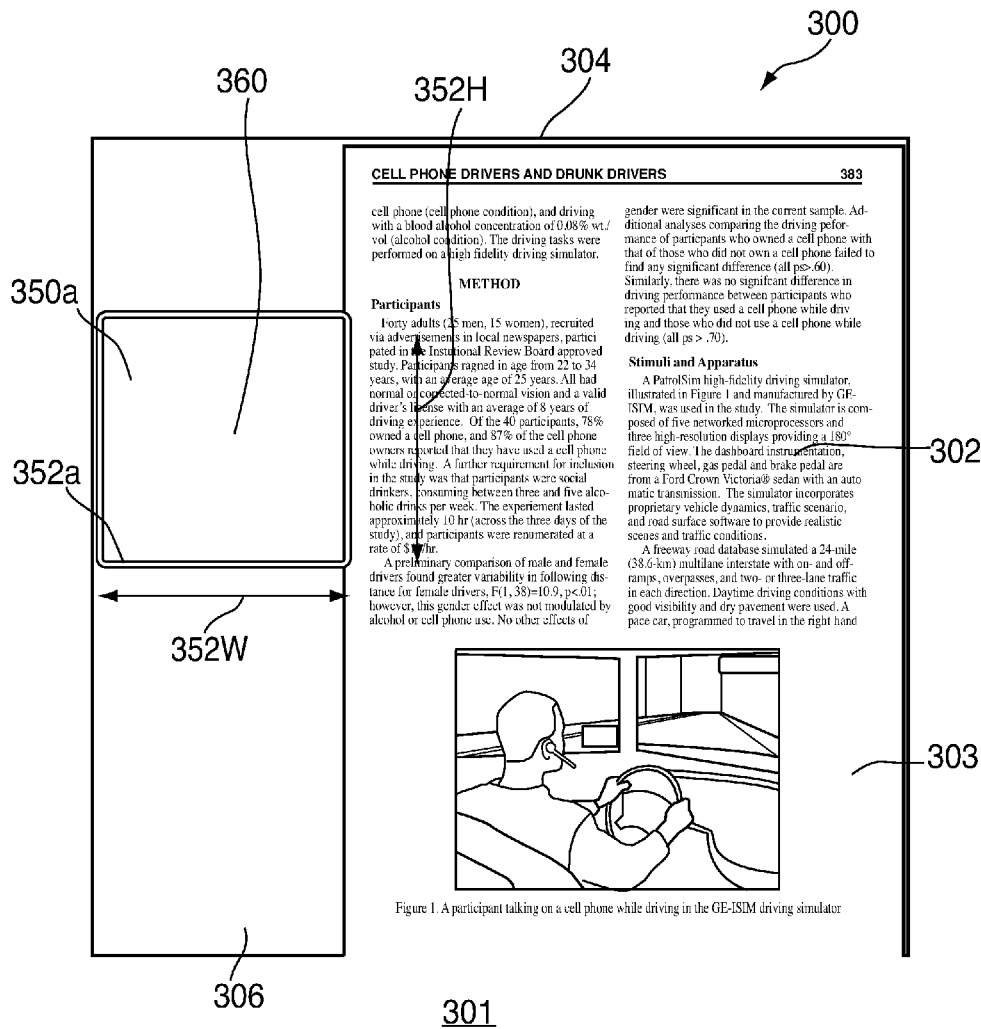
FIGS. 3A-3D are illustrative electronic device displays of successive positions of a loupe overlaid on a document in accordance with some embodiments of the invention.

Loupe 350 can have any suitable shape and size. In some cases, the dimensions 352 of loupe 350 can be determined from a region of information 302 over which cursor 360 may be positioned. In the example of FIG. 3A, cursor 360 can be positioned beyond a boundary of document 303 providing information 302. In particular, cursor 360 can be displayed in background region 306 of window 304. In such cases, loupe 350 can have a default shape and a default size. For example, dimensions 352 can include a square, a rectangle, a polygon, or a curved shape. In some cases, dimensions 352 can additionally or alternatively be determined from dimensions of document 303, or from an amount of document 303 displayed within window 304 (e.g., based on an information scale factor associated with document 303). In some cases, the size of the loupe (e.g., the size of the loupe overlay window) can be determined from an area of magnification. For example, the area of magnification can define an area around the center of magnification that is currently magnified by the loupe. In most cases, the area of magnification can extend between boundaries (e.g., boundaries along an x-axis) of a sub-region over which the loupe is positioned. The size of the loupe can then be defined as the area of magnification multiplied by a content scale factor and by a loupe scale factor.

Figure 3B:
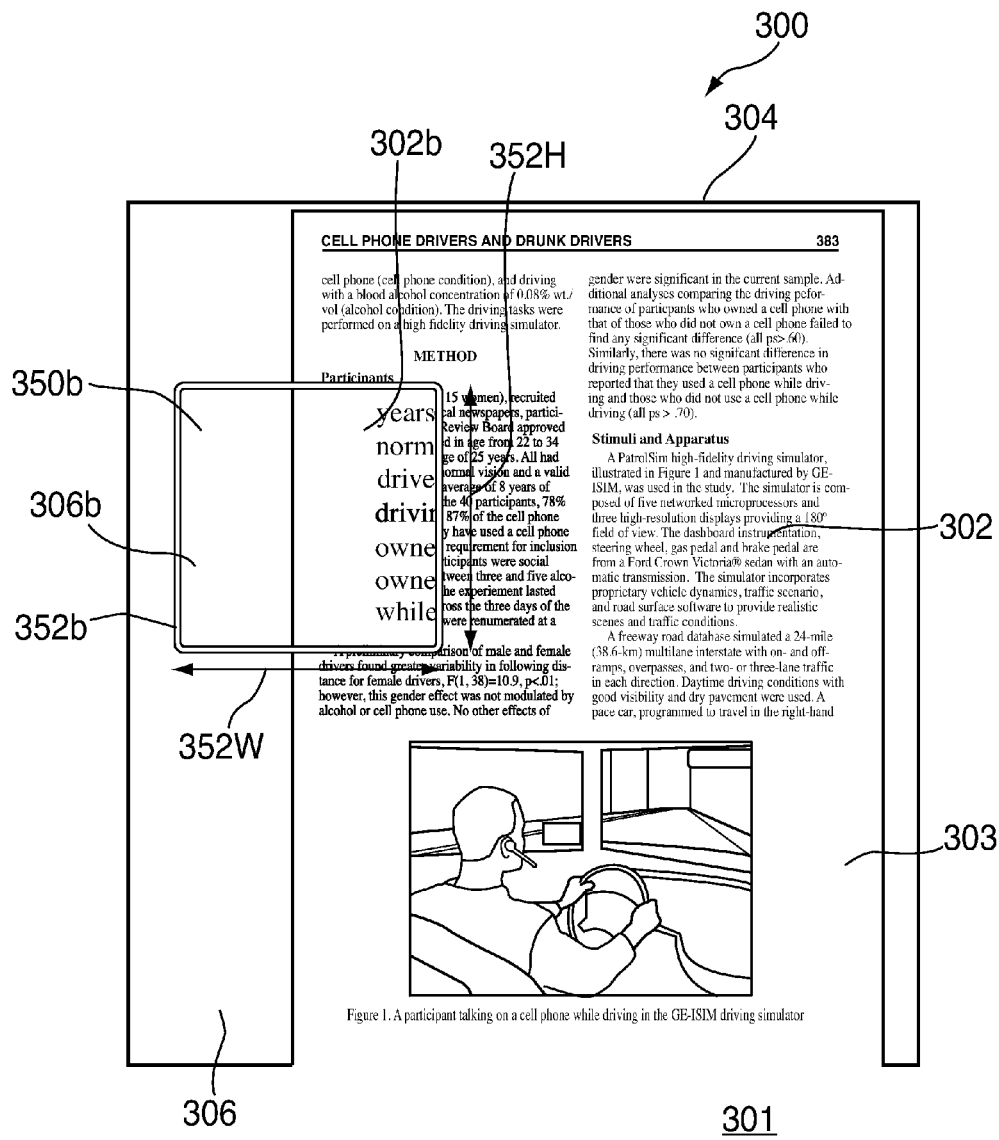
Figure 3C:
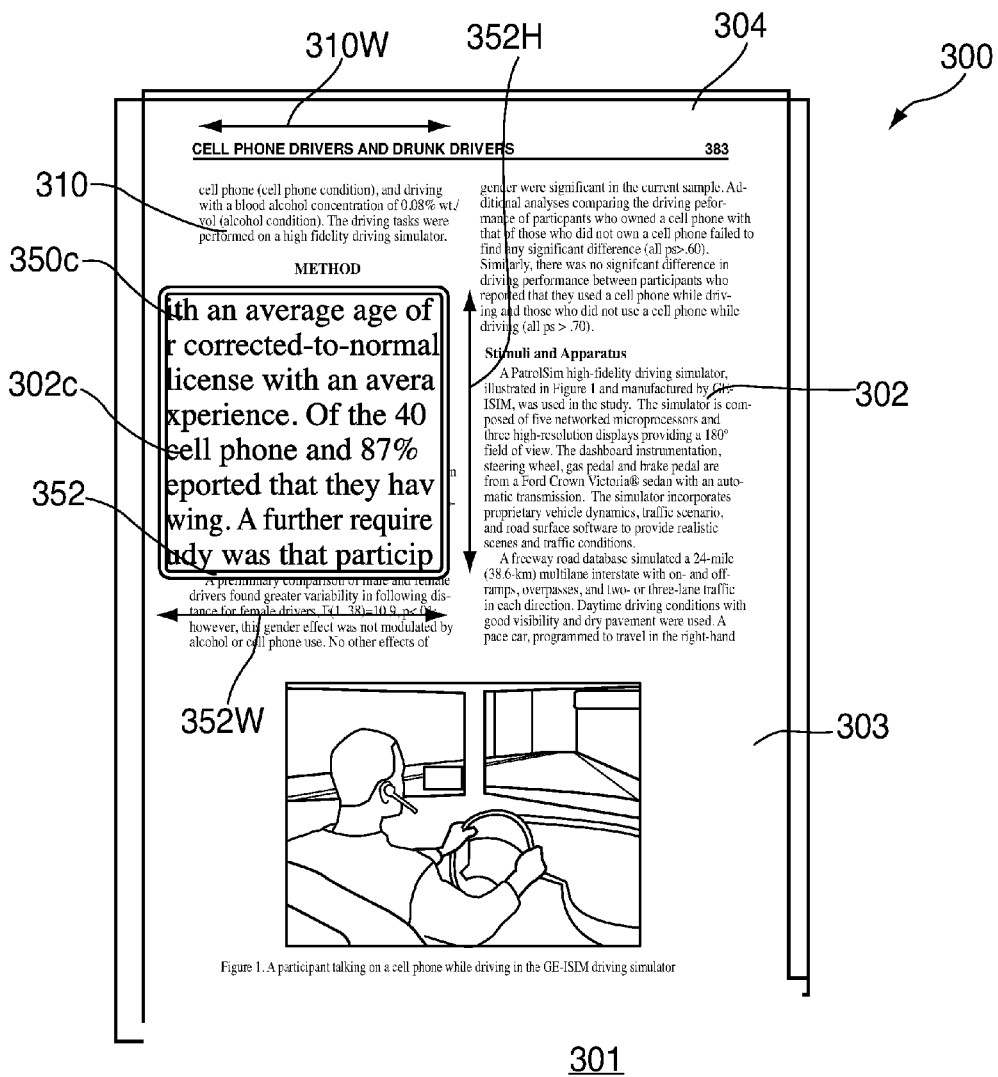
Figure 3D:
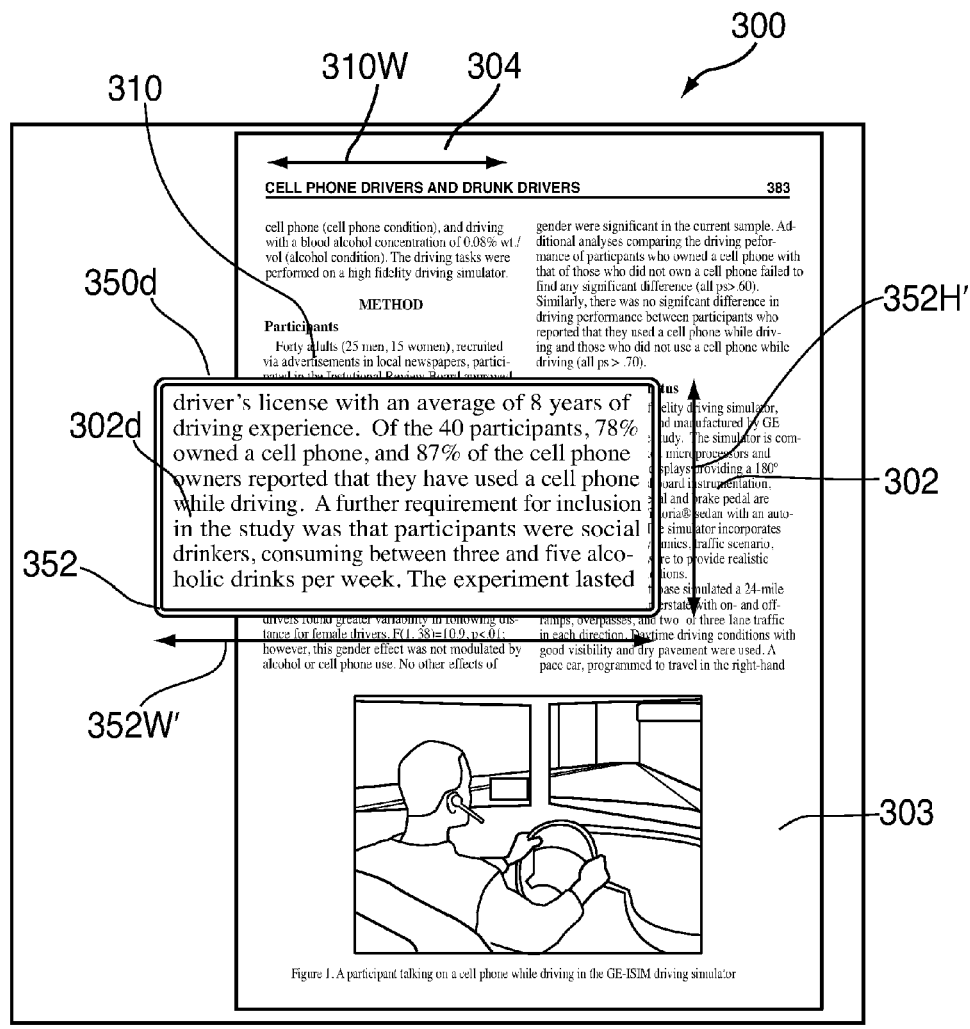

Different information can be provided in loupe 350. In some cases, the particular information provided can vary based on the position of loupe 350 relative to information 302. For example, as shown in FIG. 3A, loupe 350 (e.g., loupe 350a) can include none of information 302 but a scaled view of background region 306, which may reflect the position of cursor 360 beyond a boundary of document 303. When a user provides an input to displace loupe 350 (e.g., the user may provide an input to change the position of cursor 360), electronic device 301 can detect whether loupe 350 is positioned over a portion of document 303 such that at least some information 302 may be displayed in loupe 350. For example, as shown in FIG. 3B, loupe 350 (e.g., loupe 350b) can include portion 302b of information 302 and portion 306b of background 306. As the user provides further inputs to displace loupe 350, loupe 350 can be positioned entirely over a sub-region in which information 302 is provided. As shown in FIG. 3C, loupe 350 (e.g., loupe 350c) can include portion 302c of information 302, and no portion of background 306. The specific portions of information 302 that may be provided in loupe 350 can be determined from the position of an input cursor over a sub-region of document 303. In some cases, the input cursor may be hidden from view by loupe 350 (e.g., as shown in FIGS. 3B-3D).

As the position of loupe 350 is varied, dimensions 352 of loupe 350 can initially remain constant. For example, as shown in FIGS. 3A-3C, dimensions 352 of loupe 350 can include a default size and a default shape that may be selected because loupe 350 was initially displayed while cursor 360 was positioned over background 306. Alternatively, the dimensions of loupe 350 can be selected based on a sub-region or portion of document 303 over which loupe 350 is placed. When loupe 350 reaches a position in which a cursor or input corresponding to loupe 350 is placed over a particular sub-region (e.g., an input position is over sub-region 310, which may be similar to sub-region 210 of FIG. 2), loupe 350 can be re-sized, re-shaped, or both so that an entire portion of information provided in the sub-region can be displayed in loupe 350 according to the loupe scale factor. As shown in FIG. 3D, loupe 350 (e.g., loupe 350*d*) can be re-dimensioned relative to loupes 350*a*-350*c* of FIGS. 3A-3C. In particular, dimensions 352*d* of loupe 350*d* can have a same height 352H as dimensions 352*a*-352*c* of loupes 350*a*-350*c*, but a larger width 352W' compared to width 352W of loupes 350*a*-350*c* to accommodate portion 302*d* of information 302 that may be provided in sub-region 310 of document 303.

Electronic device 301 can determine dimensions 352*d* for loupe 350*d* using any suitable approach. In some embodiments, electronic device 301 can determine current loupe dimensions from dimensions associated with a sub-region over which the loupe is placed. In particular, a loupe may be most useful when at least one entire dimension (e.g., width) of a sub-region is displayed in the loupe, as this may allow a user to see the entirety of at least one dimension of that sub-region in the loupe without moving the loupe (e.g., a user may be able to read all of the text along certain lines of text of a sub-region without moving the loupe from left to right along a line of text. For example, dimensions of a loupe can be determined from a height or width of a sub-region, to which a loupe scale factor may be applied. When the electronic device determines that an input is provided over a sub-region that is associated with loupe dimensions other than dimension currently used to display a loupe, the electronic device can change the dimensions of the displayed loupe. Alternatively, when the electronic device determines that a displayed loupe has dimensions that do not correspond to at least one dimension of a sub-region over which the loupe is provided, the electronic device can change the dimensions of the displayed loupe.

This is shown, for example, in FIGS. 3A-3D in which the dimensions 352 of loupe 350, which may initially have default dimensions because the loupe is created while a cursor is overlaid on a background of a window, may change to new dimensions that may correspond to sub-region 310, because loupe 350 may be particularly placed with respect to sub-region 310. For example, once loupe 350 is positioned such that at least an input is provided over a particular region of document 303, dimensions 352 of the loupe may be updated based on at least one dimension of that region. As shown in FIG. 3C, when an input position corresponding to loupe 350*c* can be placed over or in region 310 of document 303, dimensions 352*c* of loupe 350*c* may be updated to dimensions 352*d* of FIG. 3D, such that a width dimension 310W of region 310 may be may be completely represented by loupe 350*d* according to the loupe scale factor of the loupe. That is, width 352W of loupe 350*c* may be updated to width 352W' of loupe 350*d*, such that all information 302 spanning across width 310W of region 310 according to the displayed information scale factor of displayed information 302 may be fully displayed across width 352W' of loupe 352*d* according to the loupe scale factor as portion 302*d* of information 302.

Figure 4A:
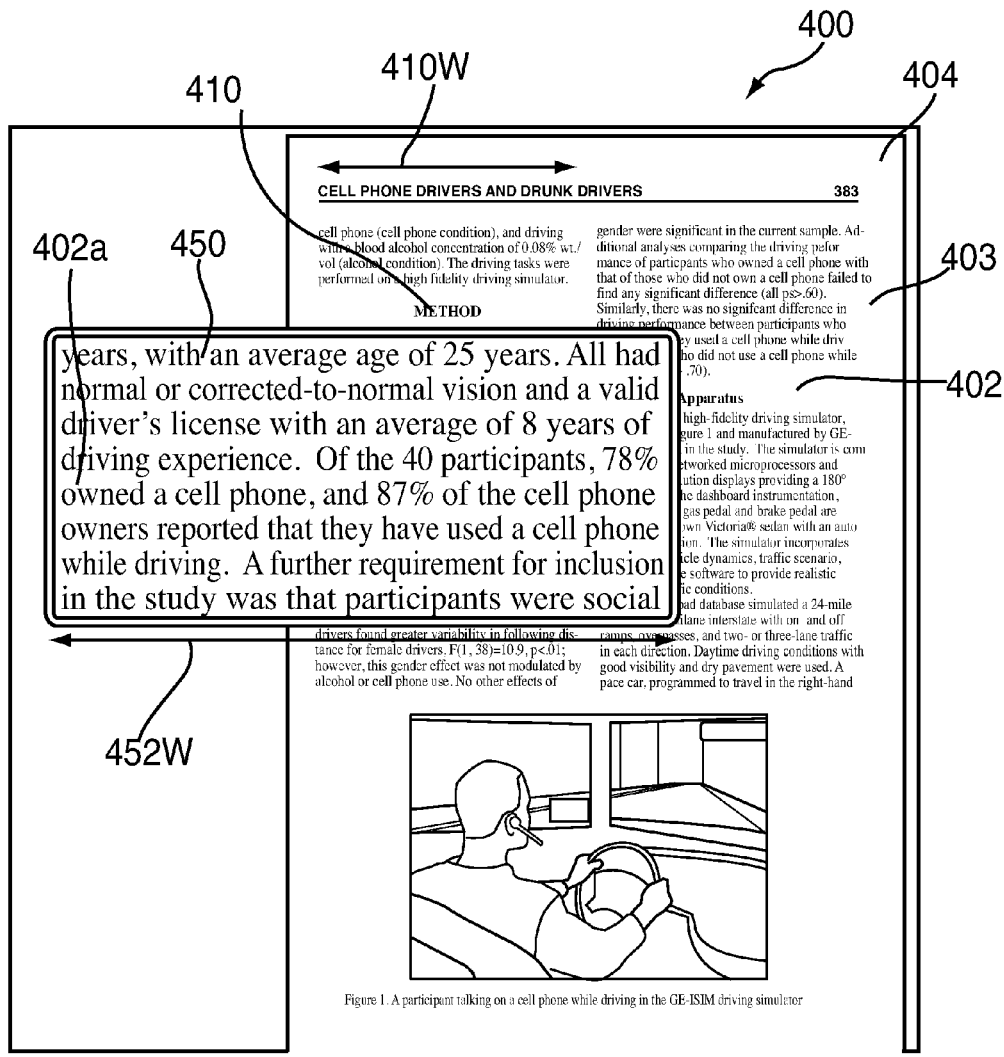
FIGS. 4A-4C are illustrative electronic device displays of a loupe displayed in different positions overlaid on a document in accordance with some embodiments of the invention.
Figure 4B:
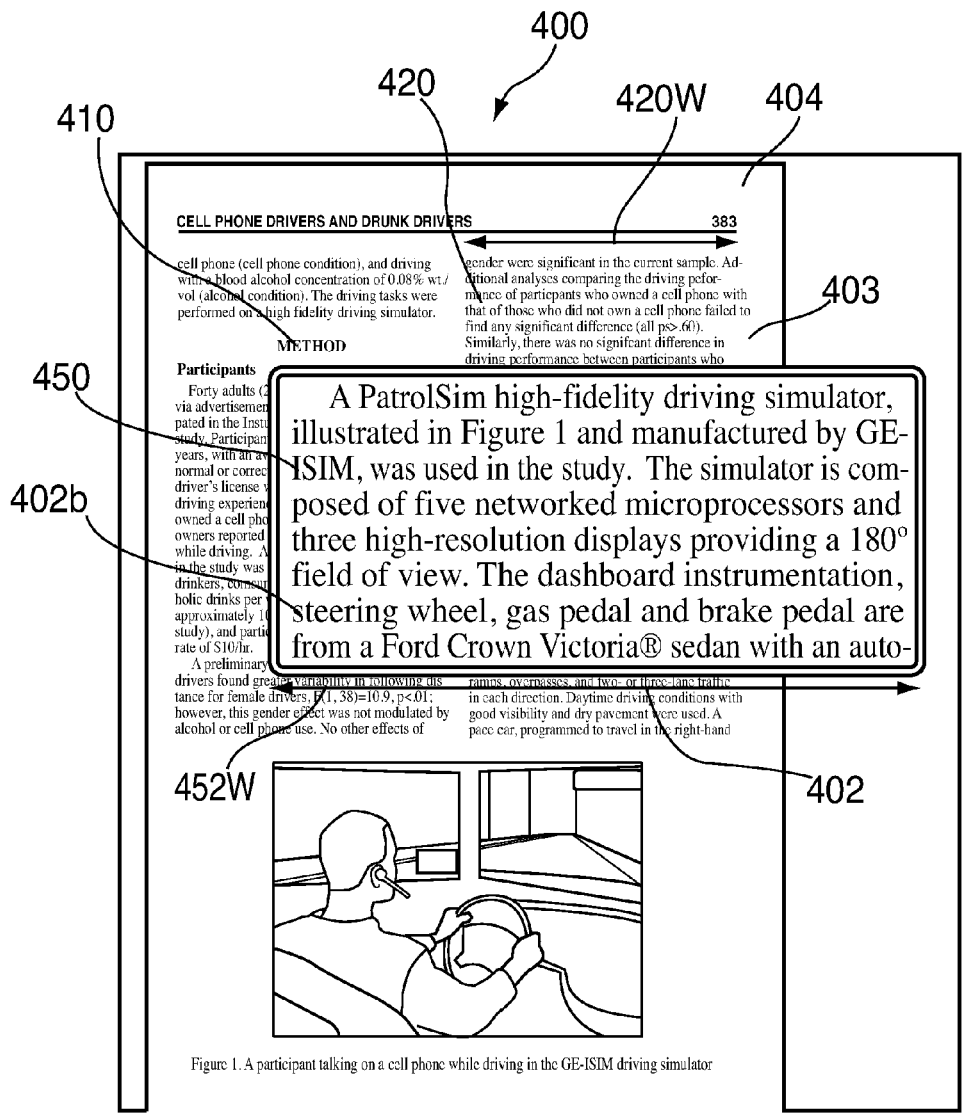
Figure 4C:
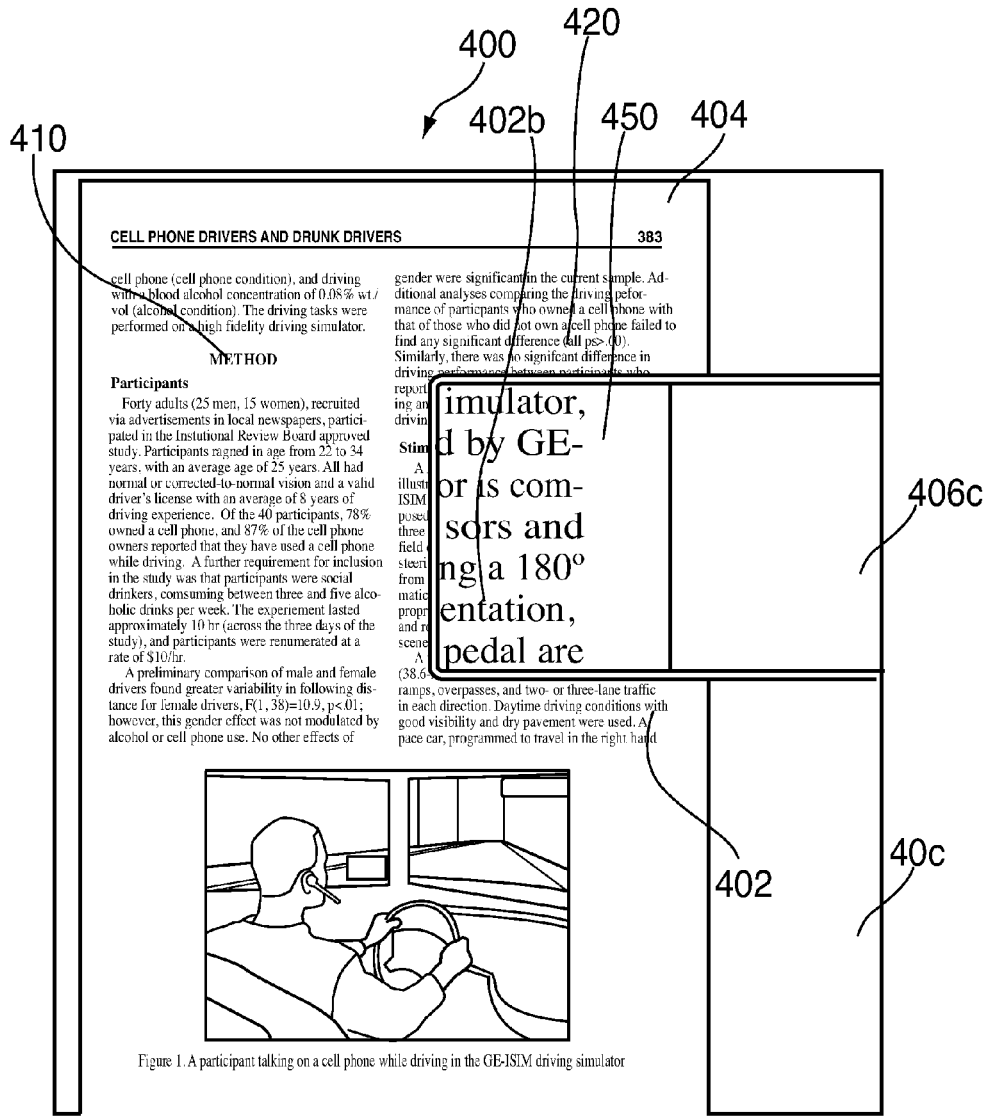

Once the dimensions of a loupe are particularly configured with respect to at least one dimension of a particular sub-region of a displayed document, the electronic device can maintain the loupe dimensions until the loupe is re-positioned with respect to a new sub-region having at least one different dimension than the previous sub-region. FIGS. 4A-4C are illustrative views of loupe 450 that may be displayed in different positions on document 403 in accordance with some embodiments of the invention. Display 400 of electronic device 401 can include information 402 of document 403 provided on the display. In some cases, information 402 can correspond to information 202 of FIG. 2 and/or information 302 of FIGS. 3A-3D, and can be distributed in a similar manner (e.g., amongst similar sub-regions). A user can direct electronic device 401 to display loupe 450 using any suitable approach. For example, a user can provide an instruction associated with enabling the loupe using an input interface. In some cases, loupe 450 can correspond to loupe 350*d* displayed in FIG. 3D.

As shown in FIG. 4A, loupe 450 can initially be provided over sub-region 410 of document 404, such that portion 402*a* of information 402 is displayed in loupe 450 according to a loupe scale factor. A user can provide an instruction to displace loupe 450, for example by moving a cursor. For example, a user can provide an instruction for moving loupe 450 from a position over sub-region 410 to a position over sub-region 420, as shown in FIG. 4B. When loupe 450 is displayed over sub-region 420, electronic device 401 can provide portion 402*b* of information 402 to be display in the loupe according to the loupe scale factor. Because sub-regions 410 and 420 may have the same dimensions (e.g., sub-regions 410 and 420 may be two similarly dimensioned columns of document 403, such that width 410W of sub-region 410 may be the same as width 420W of sub-region 420), loupe 450 may have the same dimensions when it is displayed over sub-region 410 (e.g., loupe 450 of FIG. 4A) and sub-region 420 (e.g., loupe 450 of FIG. 4B).

When a user further displaces loupe 450, the portion of information 402 displayed in the loupe can change, and can include, in some cases, portions of information from several sub-regions, or information from a sub-region and from a background of the display. For example, loupe 450 provided in FIG. 4C can include portion 402*c* of information 402 and portion 406*c* of background 406. The loupe 450 displayed in FIG. 4C can initially have substantially the same dimensions as the loupe displayed over sub-regions 410 and 420, although loupe 450 can subsequently be re-sized when it is provided over a different sub-region of document 403, or over background 406.

Figure 5A:
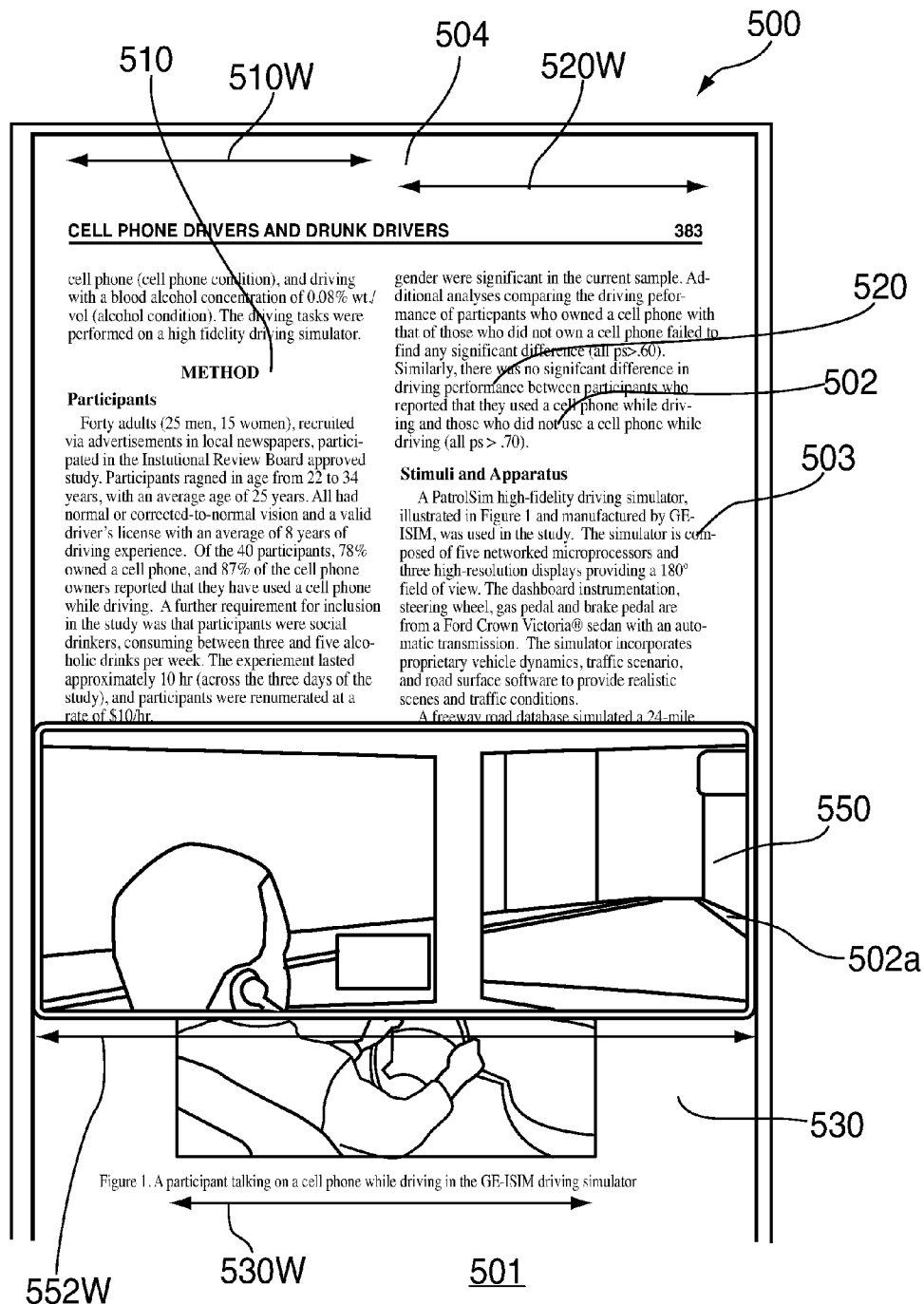
FIGS. 5A and 5B are additional illustrative electronic device displays of a loupe displayed in different positions overlaid on a document in accordance with some embodiments of the invention.
Figure 5B:
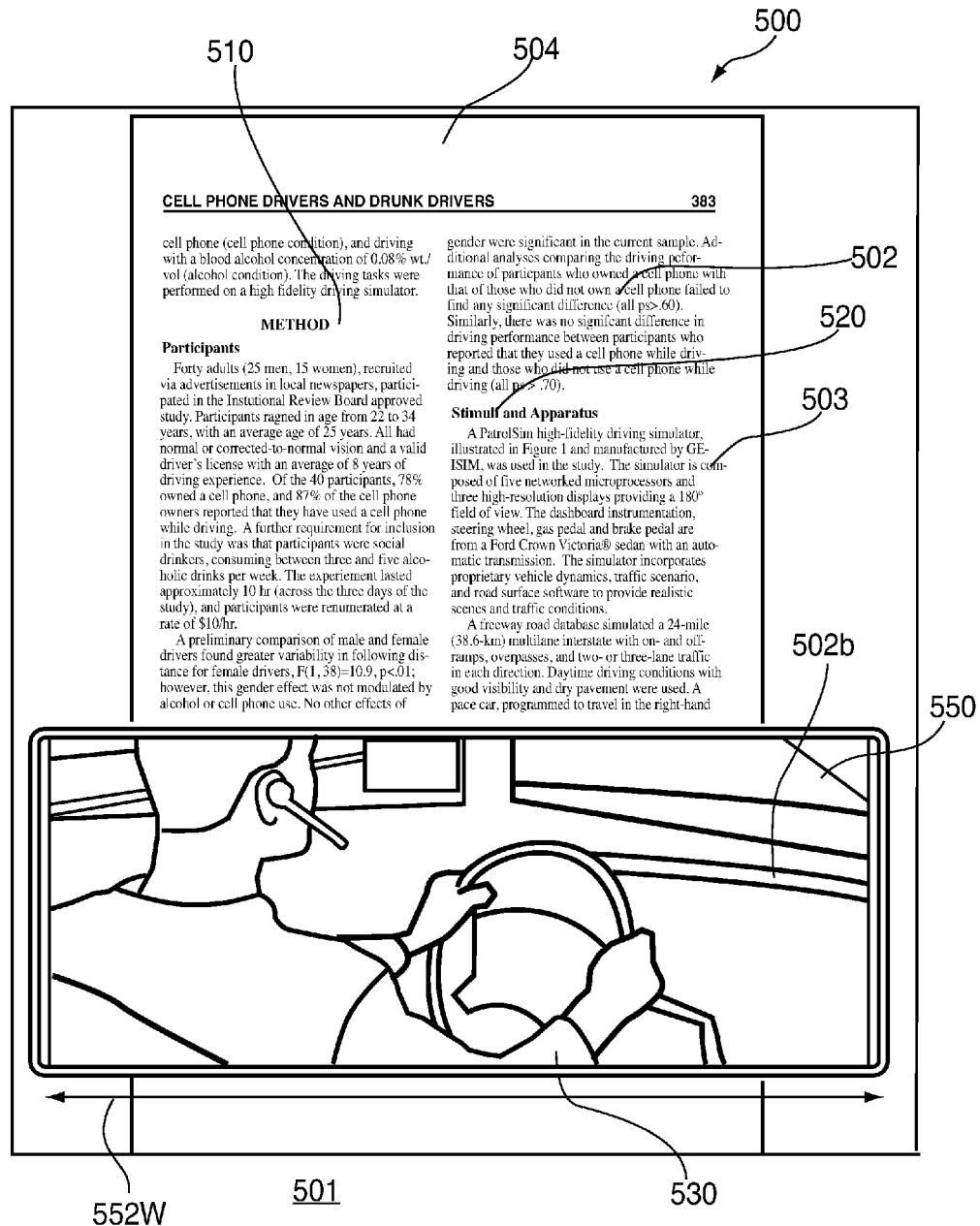

In some cases, a loupe can be displayed over sub-regions of a document that have different dimensions, and that may be associated with loupes of different dimensions. FIGS. 5A and 5B are additional illustrative views of a loupe displayed in different positions on a document in accordance with some embodiments of the invention. Display 500 of electronic device 501 can include information 502 of document 503 provided on the display. In some cases, information 502 can correspond to information 202 of FIG. 2, information 302 of FIGS. 3A-3D, and/or information 402 of FIGS. 4A-4C, and can be distributed in a similar manner (e.g., amongst similar sub-regions). Information 502 can be displayed in several sub-regions including, for example, sub-regions 510 and 520 corresponding to text columns, and sub-region 530 corresponding to a figure. A user can direct electronic device 501 to display loupe 550 using any suitable approach. For example, a user can provide an instruction associated with enabling the loupe using an input interface.

In the example of display 500, loupe 550 can be provided over sub-region 530. The dimensions of loupe 550 can differ from those of loupes 350 and 450, as loupe 550 may be provided over a sub-region having different dimensions than those over which loupes 350 and 450 are provided. In particular, loupe 550 can have a width 552W that is substantially larger than width 352W' of loupe 350d and width 452W of loupe 450, as the width 530W of sub-region 530 may be larger than width 510W of sub-region 510 and width 520W of sub-region 520. Electronic device 501 can display portion 502a of information 502 in loupe 550 according to the loupe scale factor of loupe 550. As a user moves loupe 550 over different portions of sub-region 530, the particular portion of information 502 displayed in loupe 550 can vary. For example, loupe 530 can display different portions 502a and 502b of information 502, as shown in FIGS. 5A and 5B, respectively. That is, width 552W of loupes 550a and 550b may be updated from width 352W' of loupe 350d, such that all information 502 spanning across width 530W of region 530 according to the displayed information scale factor of displayed information 502 may be fully displayed across width 552W of loupes 552a and 550d according to the loupe scale factor as portions 502a and 502b of information 502.

A loupe may be most useful when at least one entire dimension (e.g., width) of a sub-region is displayed in the loupe, as this may allow a user to see the entirety of at least one dimension of that sub-region in the loupe without moving the loupe (e.g., a user may be able to read all of the text along certain lines of text of a sub-region without moving the loupe from left to right along a line of text). It may therefore be desirable to position the loupe such that the loupe remains substantially centered relative to a sub-region (e.g., a loupe position can be weighed more heavily towards a center of a sub-region). The loupe dimensions, however, may be determined relative to a particular sub-region even when the loupe is not centered on the sub-region. Instead, the position of the loupe can be transferred or offset from a position of a user input (e.g., a cursor). In particular, the electronic device can provide an algorithm for correlating an input or cursor position with a loupe position.

Figure 6:
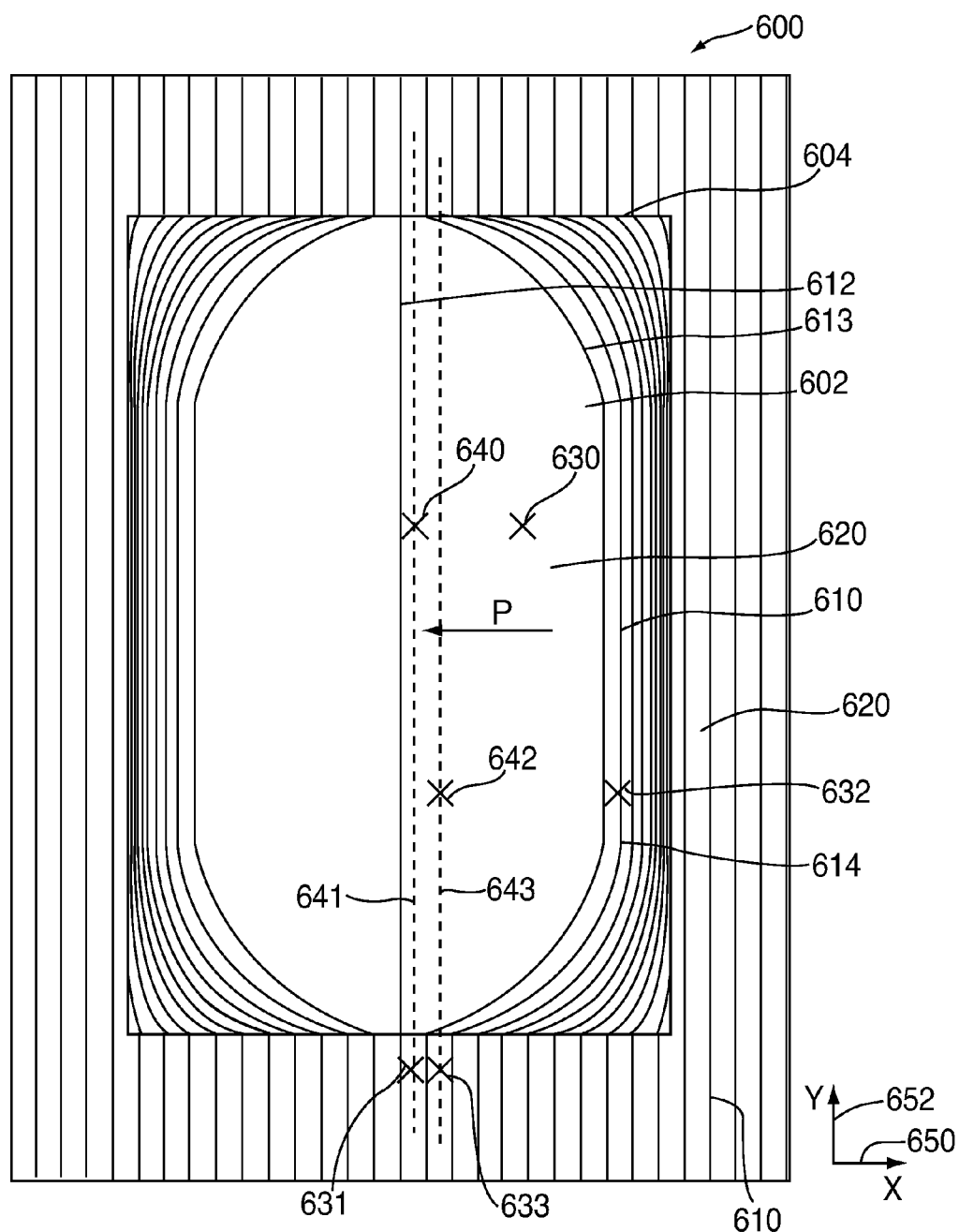
FIG. 6 is a graphical representation of a process that may be used to determine a loupe position from an input position in accordance with some embodiments of the invention.

FIG. 6 is a graphical representation 600 of a process that may be used to determine a loupe position from an input position in accordance with some embodiments of the invention. Representation 600 can correspond to a particular sub-region 602 having boundaries 604. Representation 600 can include lines 610 that may define distinct regions 620 between the lines. In some cases, lines 610 can be symmetrical about centerline 612 of sub-region 602 relative to X-axis 650. In some cases, lines 610 can alternatively or additionally be symmetrical about a centerline relative to Y-axis 652 (not shown).

An electronic device can make use of regions 620 and lines 610 to determine a loupe position (e.g., a center point position for the loupe) to be associated with a particular user input position (e.g., a position of a cursor controlled by a user input).

In some cases, lines 610 can represent input x-position that result in a same loupe output x-position. Outside of boundaries 604, the input x-position can equal the loupe output x-position (e.g., all lines are equidistant and parallel, the transfer function is f(x)=x). Inside boundaries 604, a non-linear transfer function (e.g., as described in FIG. 8) can apply, and can increase a "target area" of input x-position that results in a loupe output x-position at or near centerline 612. This can be evidenced by an increased area between lines (e.g., in region 620) immediately adjacent to centerline 612. In addition, the transfer function can return back to a function by which the input x-position can equal the loupe output x-position (e.g., f(x)=x) along boundaries 604, which can prevent an abrupt jump in the loupe position due to minor input movements along boundaries 604.

In one implementation, the electronic device can identify a region 620 that includes a user input position. The electronic device can then identify the lines 610 that bound the input position, and determine the relative distance of the input position from the identified lines. The electronic device can then follow the identified lines outside of the boundaries 604, and determine a transferred position of the input between the identified lines outside of boundaries 604 such that the input position is at the same relative distance from each identified line. The electronic device can determine the distance of the transferred position outside of boundaries 604 from centerline 612. That distance from centerline 612 can be used as the distance from the centerline for a loupe position corresponding to the initial position. The following examples will illustrate this process.

A user can provide an input at position 630. The electronic device can determine the relative distance of position 630 to the adjacent lines 610 (e.g., lines 612 and 613), and define transferred position 631 having the same relative distance to lines 612 and 613 outside of boundaries 604. The electronic device can then project transferred position 631 back into boundaries 604 along Y-axis 652 (e.g., along line 641) to identify loupe position 640 having the same y-value as input position 630, and the same x-value as transferred position 631.

As another example, a user can provide an input at position 632. The electronic device can determine the relative distance of position 632 to adjacent lines 613 and 614, and define transferred position 633 having the same relative distance to lines 613 and 614 outside of boundaries 604. The electronic device can then project transferred position 633 back into boundaries 604 along Y-axis 652 (e.g., along line 643) to identify loupe position 642 having the same y-value as input position 632, and the same x-value as transferred position 633.

The algorithm or function that may be used to define loupe positions can be graphically represented. FIGS. 7A-7D are representations of an algorithm that may be used to associate a loupe position with an input position in accordance with some embodiments of the invention. Representation 700 can include curved surfaces 720 within boundary 704 corresponding to a sub-region 702 of a displayed document. In particular, curved surfaces 720 can represent a loupe output x-position (e.g., output x) determined from x and y coordinates for an input (e.g., input x and input y). The plateau of the function can lie in the x-y input plane, and the height above or below the plateau can correspond to the loupe output x-value, where the plateau can be positioned at an output x-value at or around the input x-value corresponding to the center of the sub-region along the x-axis.

An electronic device can use any suitable mathematic function to define a loupe position from a given input position within a document or within a sub-region. In some cases, the loupe position can be determined based on a portion of a document at which an input position is detected. For example, a loupe position can be the same as an input position when the input position is outside of a defined sub-region of the document. As another example, the loupe position can differ from an input position when the input position is within a sub-region of the document. Any suitable algorithm can be used to determine the loupe position including, for example, a power function, an exponential function, a linear function, or any other mathematical relationship between coordinates of a loupe position and coordinates of an input position. The loupe dimensions can then be selected to correspond to the identified particular sub-region.

In some cases, a loupe can be associated with a loupe position for determining where to place a loupe, and a distinct loupe content position for determine which information to display in the loupe. The loupe content position can be determined relative to an input position, and can be used to identify the specific subset of information that is displayed by the loupe. In some cases, the loupe content position can be related to an input position as described above. The loupe position, describing where a loupe is provided, can be located in a position other than over a sub-region from which content id splayed. For example, a loupe used to display a portion of information from sub-region 530 (FIG. 5) can be positioned over one or both of sub-regions 510 and 520.

Figure 8:
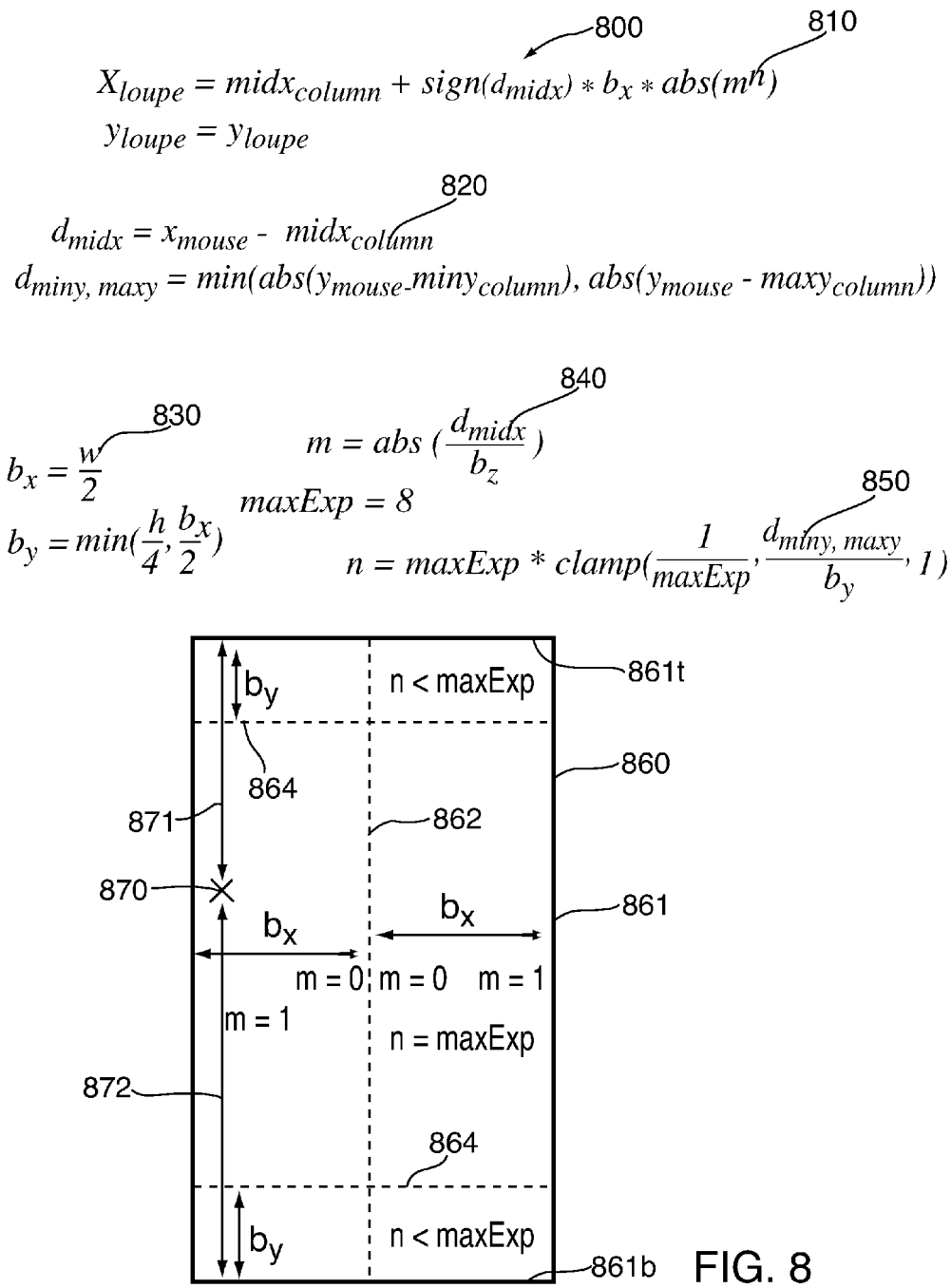
FIG. 8 is a sequence of algorithms that may be used by an electronic device to determine a loupe position from an input position in accordance with some embodiments of the invention.

FIG. 8 is a sequence 800 of algorithms that may be used by an electronic device to determine a loupe position from a user input position in accordance with some embodiments of the invention. Algorithms 800 can include an equation 810 that may determine x and y coordinate values for displaying a loupe. The x and y coordinate values can be provided in any coordinate system, including a coordinate system that may be used to provide x and y coordinates of an input. As shown in equation 810, x coordinate for the loupe, $x_{loupe}$, can be defined from the sum of an x coordinate corresponding to a centerline along an x-axis of a sub-region (e.g., $Midx_{column}$) and a factor describing a distance from the centerline of the sub-region. The factor can be expressed as a power function, such that the factor may become significant only when the input position is substantially away from the centerline. The factor can be expressed as a product of three components. The first, $d_{midx}$, can be retrieved from equation 820. The second, $b_x$, can be retrieved from equation 830, in which w may be the width of the sub-region and h may be the height of the sub-region. The third, $m^n$, can be retrieved from equations 840 and 850. The variables used in the equations of FIG. 8 are graphically represented in representation of sub-region 860 having boundaries 861. $b_x$ can express a distance to a side edge (e.g., along an x-axis) of the sub-region from centerline 862, and $b_y$ can express a distance to a top or bottom edge of the sub-region for which the exponent n is less than a maximum value (e.g., depicted by line 864). When a user provides an input at position 870 within sub-region 860, the electronic device can determine the minimum and maximum distance of the input from top and bottom boundaries 861t and 861b of sub-region 860. The maximum distance $d_{maxy}$ 872 and the minimum distance $d_{miny}$ 871 can be used as part of the power in the power function relation between an input position and a loupe position. By using $d_{maxy}$ and $d_{miny}$, the electronic device can ensure a smooth transition in the loupe position when an input moves towards one of boundaries 861t and 861b of sub-region 860.

Using this algorithm, the y-position of the loupe may correspond to the y-position of a mouse input, and the x-position of the loupe can correspond to the x-position of the mouse when the mouse is near edges of the sub-region, but may correspond to a position on or near the centerline when the mouse is farther away from edges of the sub-region. The power function causes a factor added to the centerline position to disappear or become less significant when the x-position of the mouse is away from the edge of the sub-region The dimensions of a displayed loupe can have any suitable height and width. In some cases, as discussed above, at least one of the height and width of a loupe can be based on at least one of a height and width of a sub-region that may be associated with the position of the loupe. For example, the width of a loupe can be defined as the width of an associated sub-region plus a margin amount. In some cases, the particular margin amount to be added for defining the width of a loupe can be determined from a loupe scale factor used to display a portion of the document information. As another example, a loupe height can be determined from a height of an associated sub-region, or a loupe height can be directly proportional to a width of the loupe. In some cases, an electronic device can define a minimum width and a minimum height for a loupe, for example, based on a loupe scale factor. Alternatively, a loupe height can be selected to be constant.

Figure 9A:
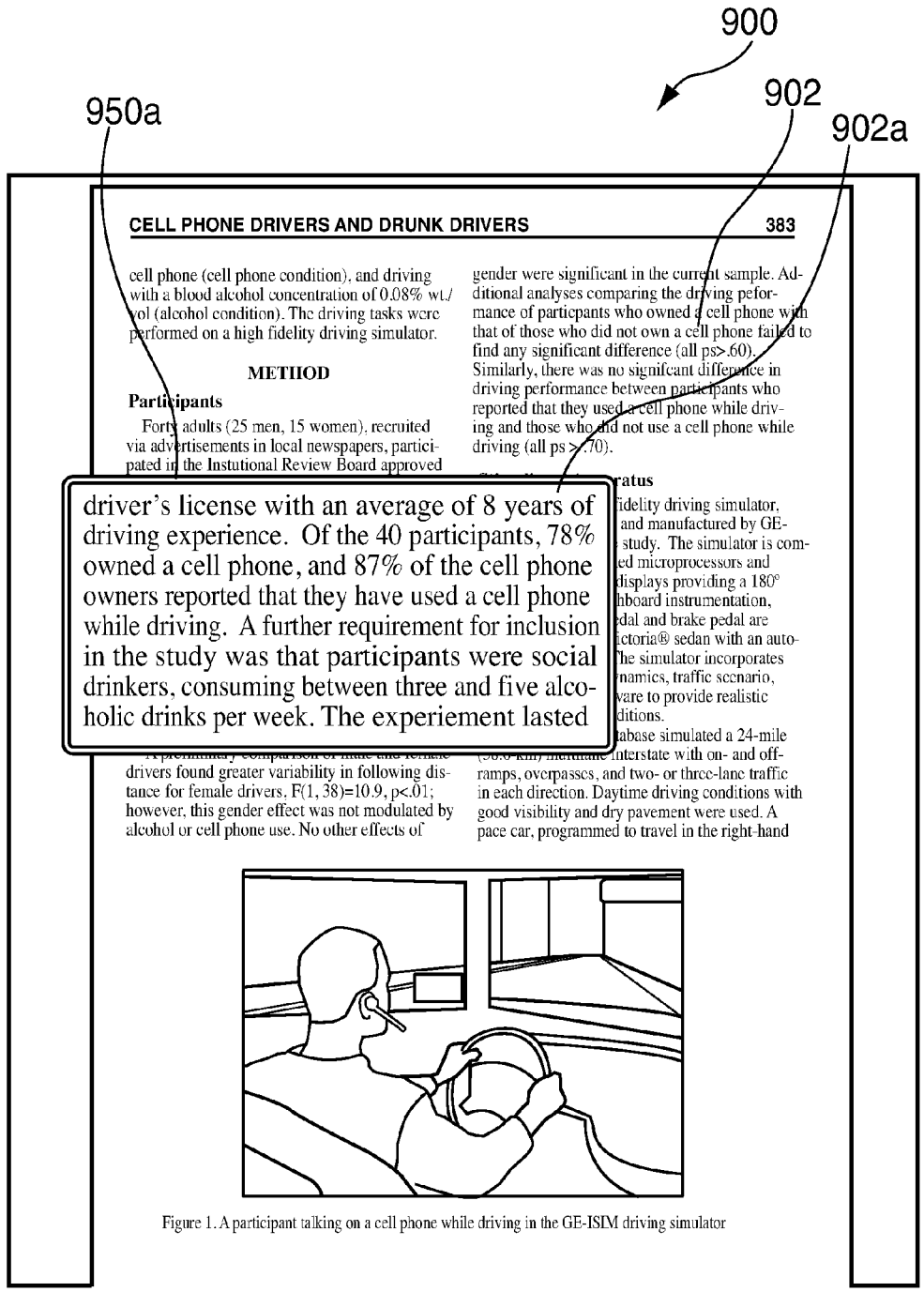
FIGS. 9A-9C are illustrative electronic device displays having a loupe displayed with different loupe scale factors in accordance with some embodiments of the invention.
Figure 9B:
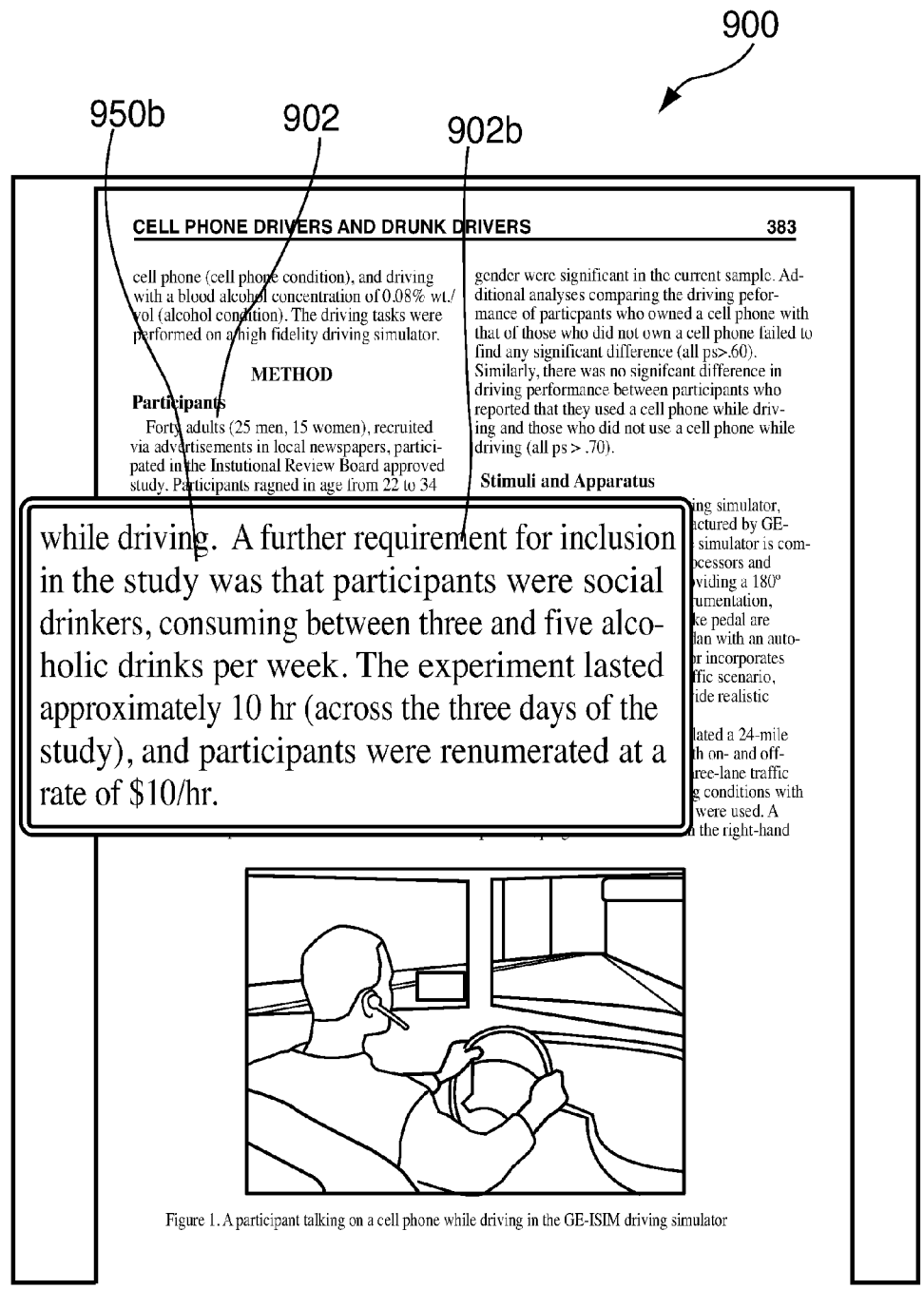
Figure 9C:
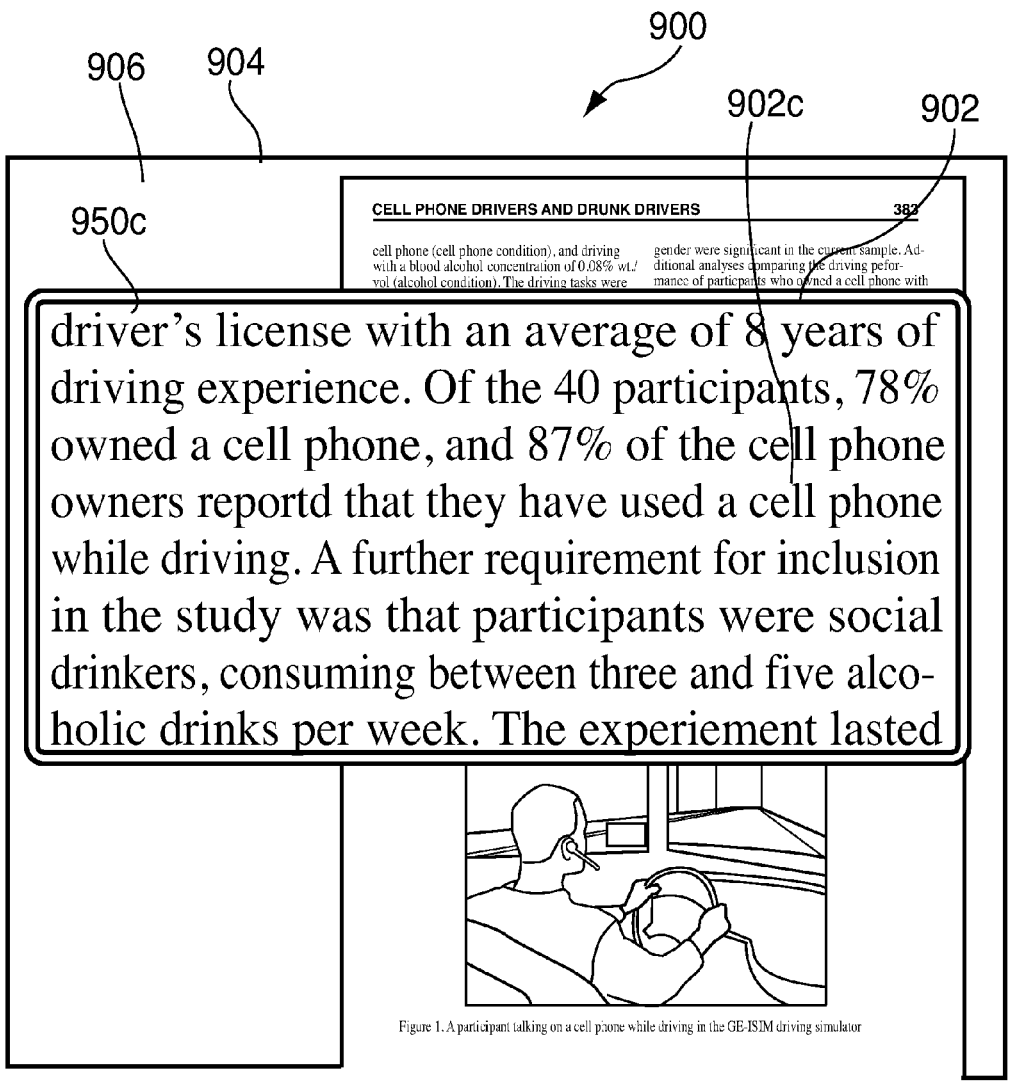

In some cases, a user can change a loupe scale factor associated with a portion of information displayed in a loupe. FIGS. 9A-9C are illustrative electronic device displays having a loupe that may be displayed with different loupe scale factors in accordance with some embodiments of the invention. As shown in FIG. 9A, display 900 of electronic device 901 can include a loupe 950a that may be displayed over information 902. Portion 902a of information 902 can be displayed in loupe 950a using a particular loupe scale factor. If a user determines that portion 902a is displayed with too small a loupe scale factor, the user can provide an instruction to increase the loupe scale factor while maintaining the information scale factor used for information 902. In particular, as shown in FIG. 9B, loupe 952b can include a portion 902b of information 902. Because portion 902b can be displayed with a larger loupe scale factor than the loupe scale factor used for portion 902a, loupe 950b can have larger dimensions than loupe 950a. In particular, loupe 950b can have a larger width than loupe 950a so that portion 902b can accommodate the larger scale factor of loupe 950b. In some cases, loupe 950a and loupe 950b can have a same height. Alternatively, the height of loupe 950b can increase to accommodate the larger scale factor of loupe 950b.

Electronic device 901 can provide information in a loupe using any suitable scale factor. For example, portions of information can be displayed using a larger scale factor, such that the loupe may extend beyond boundaries of a document. As shown in FIG. 9C, loupe 950c can include portion 902c of information 902 displayed with a larger scale factor than that used for loupe 950a and loupe 950b. The resulting loupe 950c can extend beyond edges of document 903, and over background 906. In some embodiments, an overlay can extend beyond a boundary of window 904 (e.g., and into other regions of a display). In some cases, the electronic device can instead automatically re-size window 904 to accommodate a larger loupe provided with a larger scale factor.

Figure 10A:
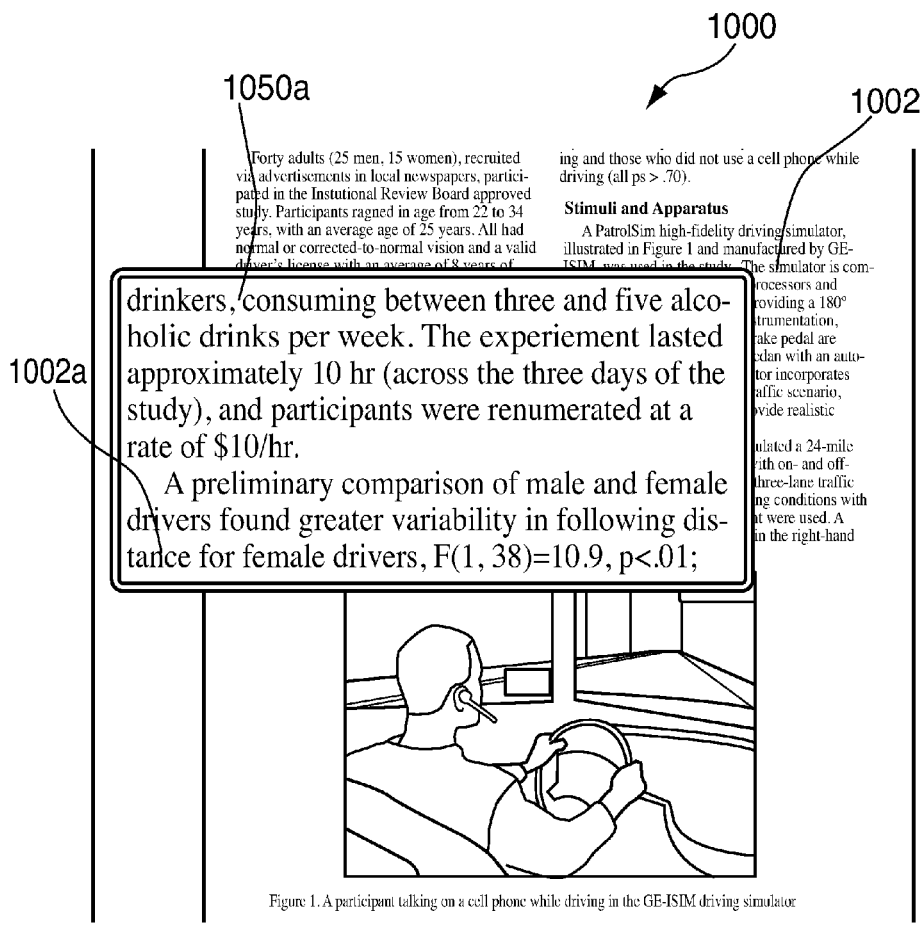
FIGS. 10A and 10B are illustrative views of information displayed with different information scale factors in accordance with some embodiments of the invention.
Figure 10B:
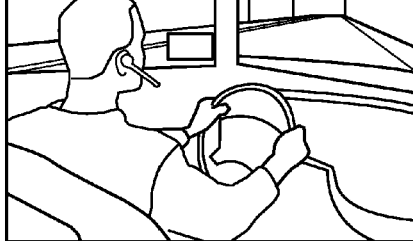

In addition to allowing a user to change a scale factor of portions of displayed information provided in a loupe, a user can change an information scale factor for an entire document. FIGS. 10A and 10B are illustrative views of information displayed with different information scale factors in accordance with some embodiments of the invention. Display 1000 of electronic device 1001 can include information 1002 over which loupe 1050a may be provided. For example, FIG. 10A can include information 1002 having loupe 1050a used to display portion 1002a of information 1002. Information 1002 can be displayed using an information scale factor, and portion 1002a of the information can be displayed using a loupe scale factor that may be larger than the information scale factor. In some cases, electronic device 1001 can provide a particular relationship between the information scale factor and the loupe scale factor.

When a user provides an instruction to increase the information scale factor used to display information, for example as shown in FIG. 10B, electronic device 1001 can simultaneously increase the information scale factor and the loupe scale factor. In particular, the loupe scale factor can be increased by a same amount as the information scale factor is increased. Resulting loupe 1050b and portion 1002b of information 1002 displayed by loupe 1050b can have a larger loupe scale factor than that of loupe 1050a, which may correspond to a larger information scale factor for information 1002 of FIG. 10B than that of FIG. 10A. Alternatively, despite an information scale factor being adjusted, a loupe scale factor of a loupe may be maintained.

Figure 11A:
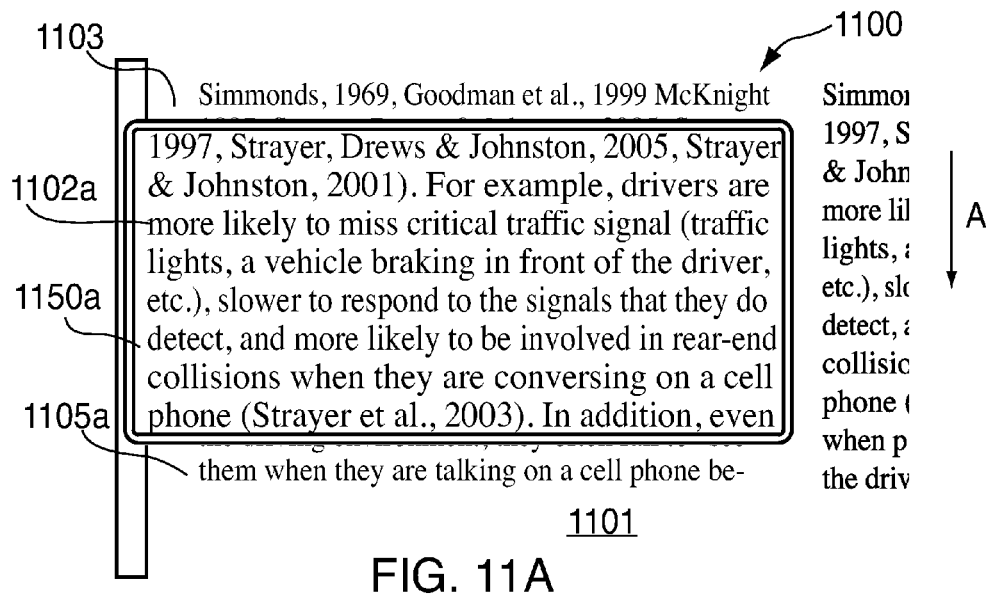
FIGS. 11A-11E are illustrative views of a loupe displayed over information that may be scrolled in accordance with some embodiments of the invention.
Figure 11B:
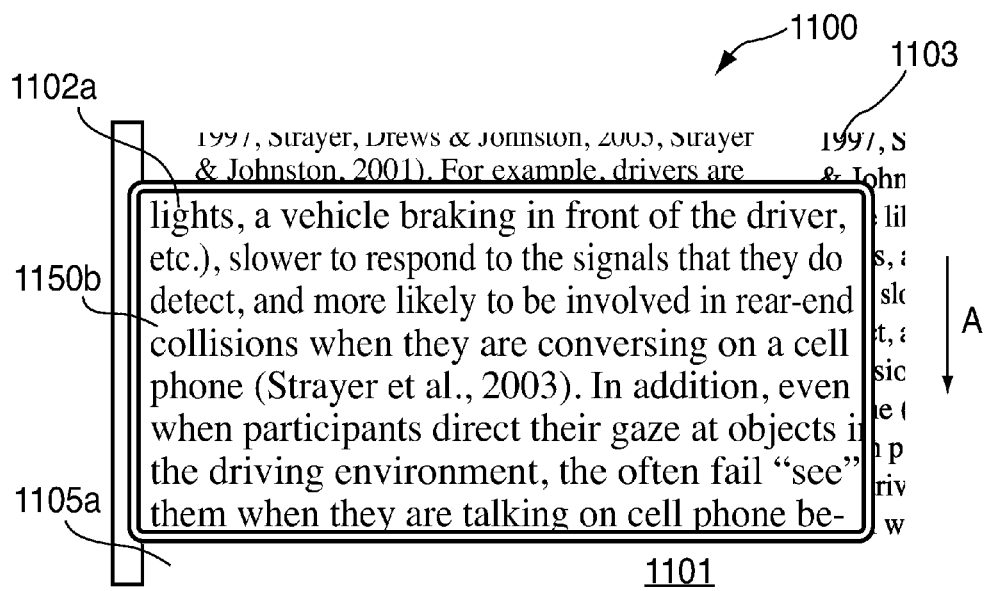

In some cases, a user can direct an electronic device to display, in a loupe, portions of information that are not initially provided on the display. For example, a user can direct the electronic device to scroll a display of information while the loupe is displayed. FIGS. 11A-11E are illustrative views of a loupe that may be displayed over information that is scrolled in accordance with some embodiments of the invention. Display 1100 can include information 1102 that may be provided as part of document 1103. A user can direct an electronic device to display a loupe over information 1102. As the user moves the loupe over information 1102, the particular portion of information 1102 that may be provided in the loupe, and the particular information provided in the display, can change. Initially displayed loupe 1150a, which can include portion 1102a of information 1102, can be displaced towards a display end portion 1105a of information 1102 of document 1103 as presented in display 1100 of FIG. 11A (e.g., in the direction of arrow A). As shown in FIG. 11B, loupe 1150b can be aligned with display end portion 1105a of document 1103, such that portion 1102b of information 1102 provided in loupe 1150b may correspond to a portion of information 1102 adjacent to display end portion 1105a of display 1100. For example, display end portion 1105a may correspond to the lower most portion of document 1103 that may be initially displayed by display 1100 of FIGS. 11A and 11B.

Figure 11C:
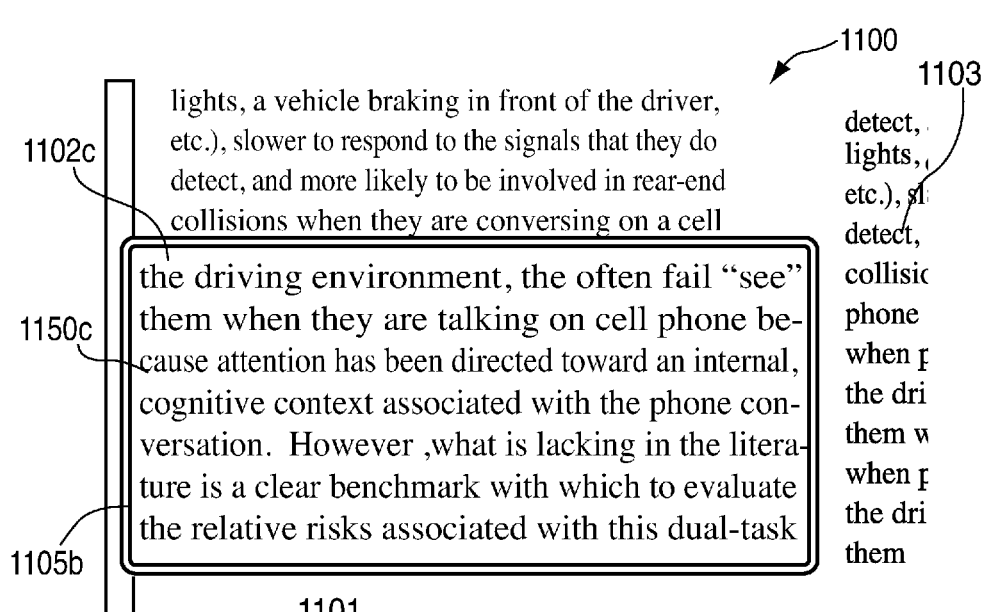
Figure 11D:
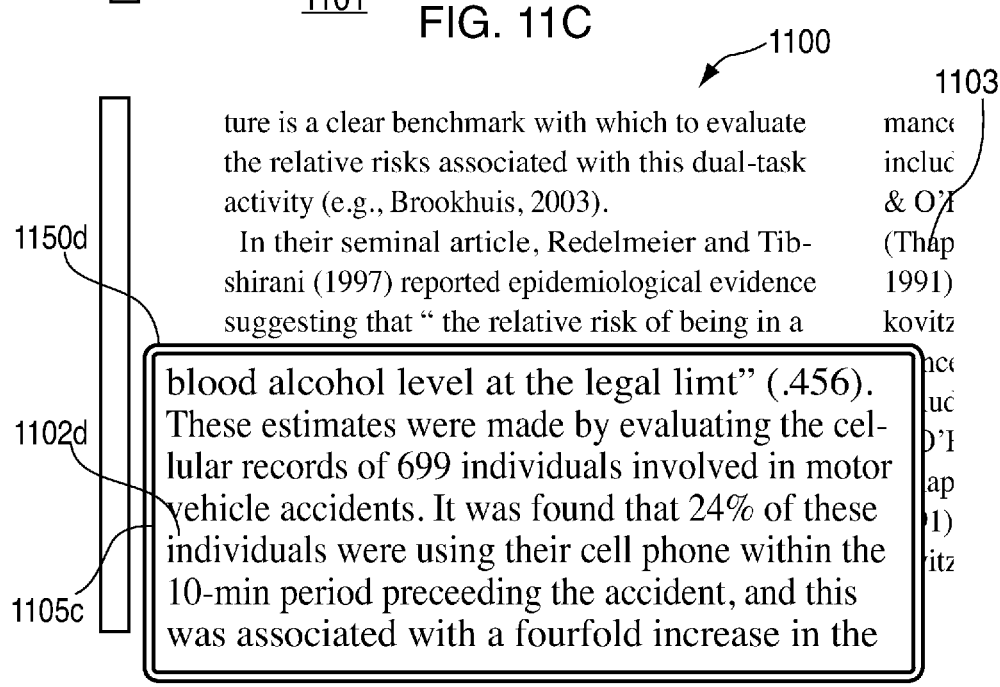
Figure 11E:
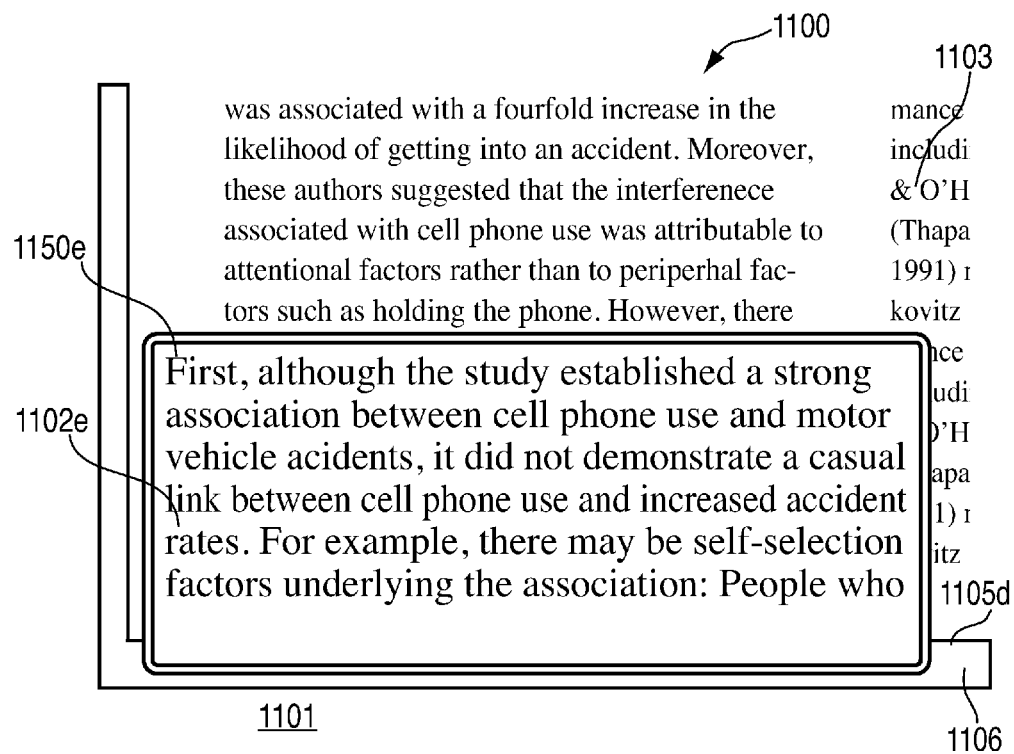

If a user provides further instructions to continue to displace loupe 1150b in that same direction of arrow A, there may be no more displayed information 1102 in display 1100 that the device can provide in the loupe. Accordingly, the electronic device may scroll information 1102 of document 1103 that is provided in display 1100 such that the device may provide a new display end portion 1105b of information 1102 as presented in display 1100. As shown in FIG. 11C, loupe 1150c can include portion 1102c of information 1102 of document 1103 at new display end portion 1105b as presented in display 1100 that was not entirely provided in the displayed information 1102 of FIGS. 11A and 11B. A user can continue to displace a loupe in the direction of arrow A, which may cause displayed information 1102 to scroll along display 1100 (e.g., as shown by FIG. 11D with portion 1102d of information 1102 displayed in loupe 1150d at a new display end portion 1105c as presented in display 1100 that was not entirely provided in the displayed information 1102 of FIG. 11C) until the electronic device reaches a document end boundary 1105d of document 1103. As shown in FIG. 11E, loupe 1150e can include a portion 1102e of information 1102, where portion 1102e may correspond to a portion of information 1102 that may be adjacent to document end boundary 1105d of document 1103. In some cases, loupe 1150e can be placed over a portion of background 1106 that may be adjacent to document end boundary 1105d.

Figure 12:
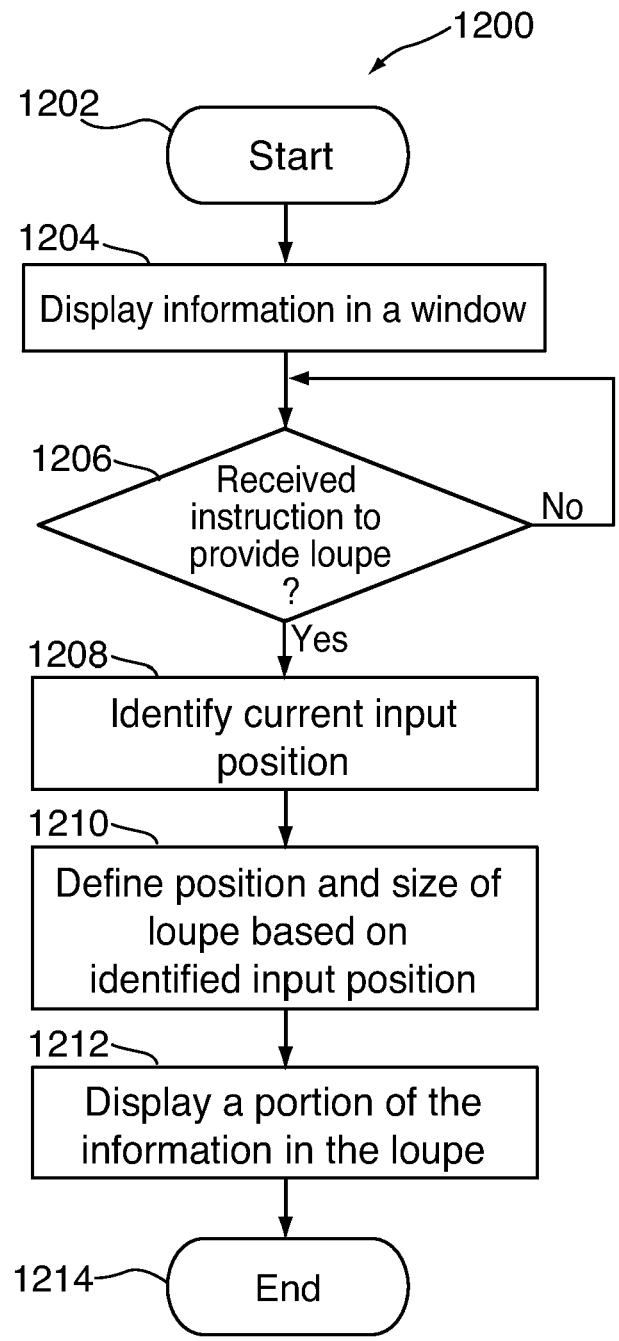
FIG. 12 is a flowchart of an illustrative process for displaying a dynamic loupe in accordance with some embodiments of the invention.

The following flowcharts describe illustrative processes that may be used for providing a dynamic loupe in accordance with some embodiments of the invention. FIG. 12 is a flowchart of an illustrative process 1200 for displaying a dynamic loupe in accordance with some embodiments of the invention. Process 1200 can begin at step 1202. At step 1204, information can be displayed in a window. For example, an electronic device can display content using an application. At step 1206, an electronic device can determine whether an instruction to display a loupe was received. For example, the electronic device can determine whether a user provided an instruction, using an input interface, to display a loupe. If the electronic device determines that no instruction was provided, process 1200 can return to step 1206. If, at step 1206, the electronic device instead determines that an instruction to display a loupe was provided, process 1200 can move to step 1208.

At step 1208, an input position at which to place a loupe can be identified. For example, the electronic device can identify a cursor position. As another example, the electronic device can identify a position of a touch input. In some cases, a sub-region of the information adjacent to the input position can be identified. At step 1210, a position and size of the loupe can be identified. For example, the electronic device can determine a loupe position related to a sub-region adjacent to the input position. A size of the loupe may be determined based on a scale factor associated with the displayed content, a scale factor associated with a loupe to be created, at least one dimension of a sub-region that may be associated with the loupe, a size of a display on which a loupe is to be presented, and/or any other suitable information. At step 1212, a portion of the displayed information can be displayed in the loupe. For example, a portion of the information can be displayed using a scale factor associated with the loupe. The scale factor of the loupe may be larger than a scale factor used to display the information in the window. Process 1200 can then move to step 1214 and end.

Figure 13:
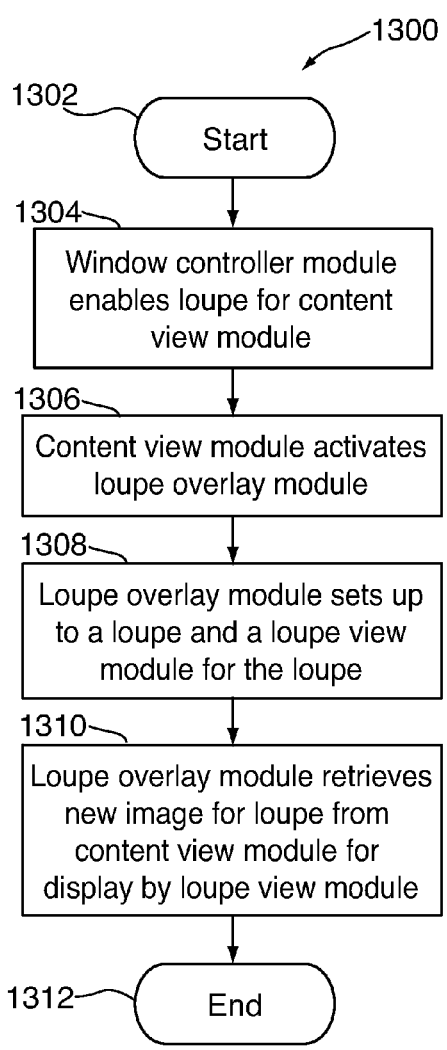
FIG. 13 is a flowchart of an illustrative process for displaying a loupe using modules in accordance with some embodiments of the invention.

Steps of the following flowchart are described in the context of modules performing the process steps. It will be understood, however, that any electronic device component can perform the described process steps. FIG. 13 is a flowchart of an illustrative process 1300 for displaying a loupe using modules in accordance with some embodiments of the invention. Process 1300 can begin at step 1302. At step 1304, a window controller module can enable a loupe tool on an existing content view module. For example, the window controller module can enable a loupe overlay for a provided content view module. At step 1306, the content view module can activate a loupe overlay module. For example, the content view module can direct the loupe overlay module to activate such that the content view module may provide the information to be displayed in a loupe. At step 1308, the loupe overlay module can set up a loupe and a loupe view module. For example, the loupe overlay module can determine a size and position of the loupe. At step 1310, the loupe overlay module can retrieve a new image for the loupe from the content view module. The retrieved image can be displayed by the loupe view module. Process 1300 can end at step 1312.

Figure 14:
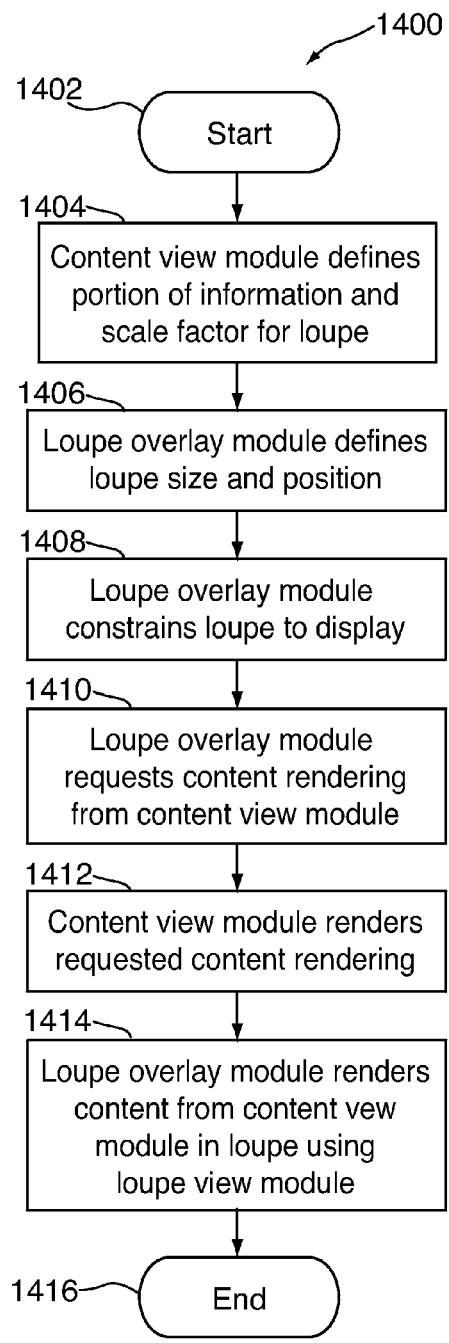
FIG. 14 is a flowchart of an illustrative process for initializing and displaying information in a loupe using modules in accordance with some embodiments of the invention.

Steps of the following flowchart are described in the context of modules performing the process steps. It will be understood, however, that any electronic device component can perform the described process steps. FIG. 14 is a flowchart of an illustrative process 1400 for initializing and displaying information in a loupe using modules in accordance with some embodiments of the invention. Process 1400 can begin at step 1402. At step 1404, a content view module can define a portion of information and a scale factor for use by a loupe. At step 1406, a loupe overlay module can define a loupe size and position at which the loupe is to be displayed. For example, a loupe overlay module can determine a loupe size from dimensions associated with information over which the loupe is provided. The loupe overlay module can determine a loupe position based on a position of an input relative to the information over which the loupe is provided. At step 1408, the loupe overlay module can constrain the loupe to a display. For example, the loupe overlay module can limit the loupe position to a screen or display of the device (e.g., the loupe cannot extends beyond boundaries of a display, such that the entirety of the loupe is always visible). In some cases, the loupe overlay module can instead constrain the loupe to a particular window over which the loupe is displayed. At step 1410, the loupe overlay module can request information to display from the content view module. For example, the loupe overlay module can request an information rendering from the content view module with a given loupe scale factor. At step 1412, the content view module can render an image having the requested information. In some cases, the content view module can add a frame, shape or transparency attributes to the rendered image. At step 1414, the loupe overlay module can render information retrieved from the content view module in the loupe using the loupe view module. For example, the loupe overlay module can re-render the information provided from the content view model for formatting and display in the loupe. Process 1400 can then end at step 1416.

Figure 15:
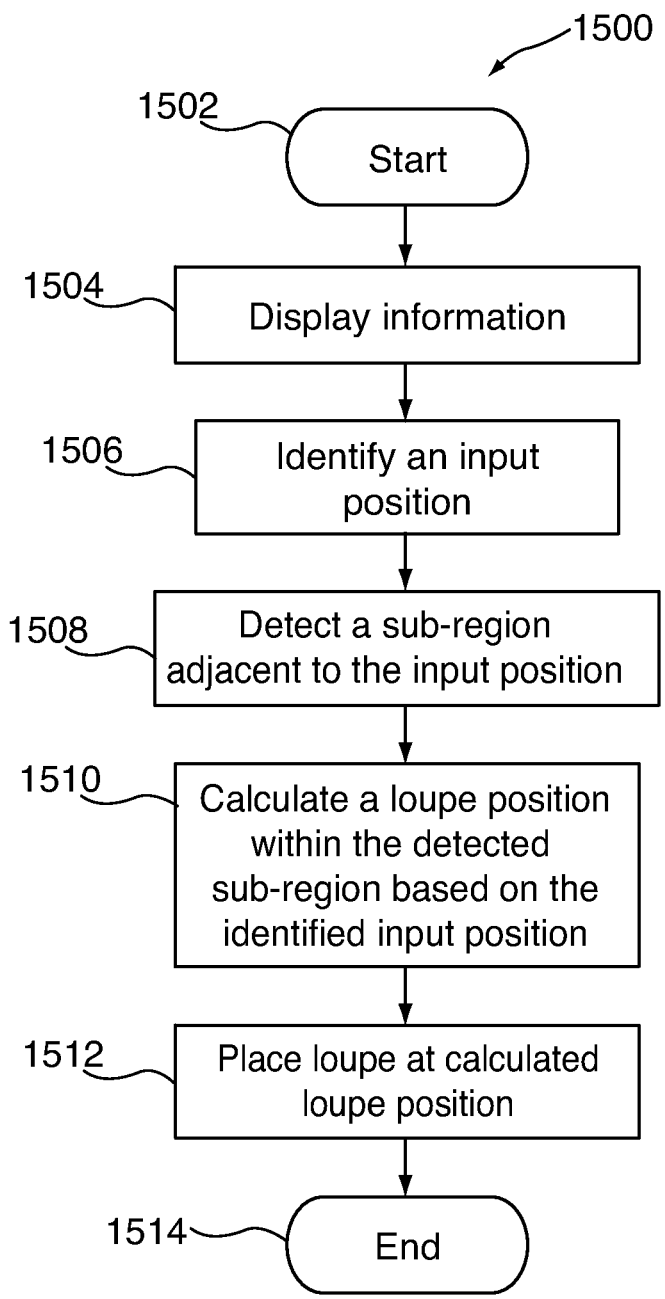
FIG. 15 is a flowchart of an illustrative process for positioning a loupe in accordance with some embodiments of the invention.

FIG. 15 is a flowchart of an illustrative process 1500 for positioning a loupe in accordance with some embodiments of the invention. Process 1500 can begin at step 1502. At step 1504, information can be displayed, for example in a window. For example, an electronic device can display content using an application. At step 1506, an input position can be identified. For example, an electronic device can identify a cursor position, or identify a position of a touch input. At step 1508, a sub-region associated with the input position can be detected. For example, the electronic device can identify one of several sub-regions in which information is provided that is most proximal or most closely associated with the detected input position. In particular, the electronic device can determine a sub-region in which an input is provided. If the input is provided near an edge of the sub-region, the electronic device can identify other adjacent sub-regions. At step 1510, a loupe position can be calculated within the detected sub-region based on the identified input position. For example, the electronic device can apply an algorithm to project a detected input position towards a centerline of the identified sub-region. At step 1512, the loupe can be placed with respect to the calculated loupe position. For example, the electronic device can overlay the loupe on the displayed information about the calculated loupe position (e.g., the calculated loupe position may be the center of the overlayed loupe). Process 1500 can end at step 1514.

Figure 16:
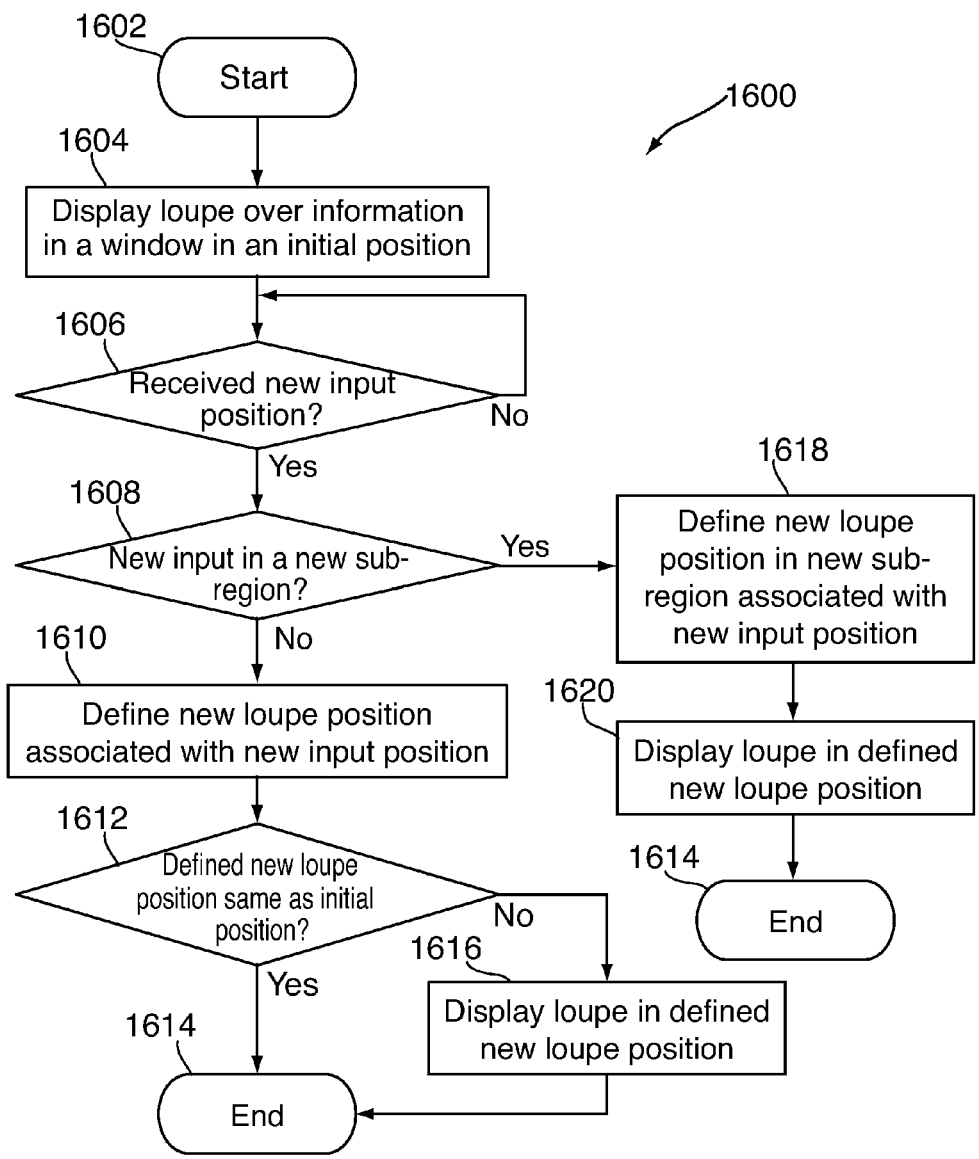
FIG. 16 is a flowchart of an illustrative process for changing a loupe position in accordance with some embodiments of the invention.

FIG. 16 is a flowchart of an illustrative process 1600 for changing a loupe position in accordance with some embodiments of the invention. Process 1600 can begin at step 1602. At step 1604, a loupe can be displayed in an initial position over displayed information of a document on an electronic device display. For example, an electronic device can identify an initial sub-region of the document with which the initial position of the loupe may be associated. At step 1606, the electronic device can determine whether a new input position was received. For example, the electronic device can determine whether a user provided an input using an input interface. If the electronic device determines that no new input position was received, process 1600 can return to step 1606.

If, at step 1606, it is instead determined that a new input position was received, process 1600 can move to step 1608. At step 1608, the electronic device can determine whether the new input position is associated with a new sub-region. For example, the electronic device can identify a particular sub-region over which the new position is located. If the electronic device determines that the new input position is not associated with a new sub-region, process 1600 can move to step 1610. At step 1610, a new loupe position associated with the new input position can be defined. For example, the electronic device can project the new input position towards a centerline of the initial sub-region. At step 1612, the electronic device can determine whether the new loupe position is the same as the initial position of the loupe. If the electronic device determines that the new loupe position is the same as the initial loupe position, process 1600 can move to step 1614 and end. Alternatively, if the electronic device determines that the new loupe position is not the same as the initial loupe position, process 1600 can move to step 1616 and may display the loupe in the defined new loupe position. In some cases, the information provided in the loupe can change based on the loupe position or on an input position. Process 1600 can then end at step 1614.

Returning to step 1608, if the electronic device instead determines that the new input position is associated with a new sub-region, process 1600 can move to step 1618. At step 1618, a new loupe position that may be associated with the new sub-region can be defined, where the new loupe position may be associated with the new input position. For example, the electronic device can identify a position near a centerline of the new sub-region. At step 1620, the loupe can be displayed in the defined new loupe position, which may be positioned over at least a portion of the new sub-region. In some cases, the information provided in the loupe can change based on the loupe position or on an input position. Process 1600 can then end at step 1614.

Figure 17:
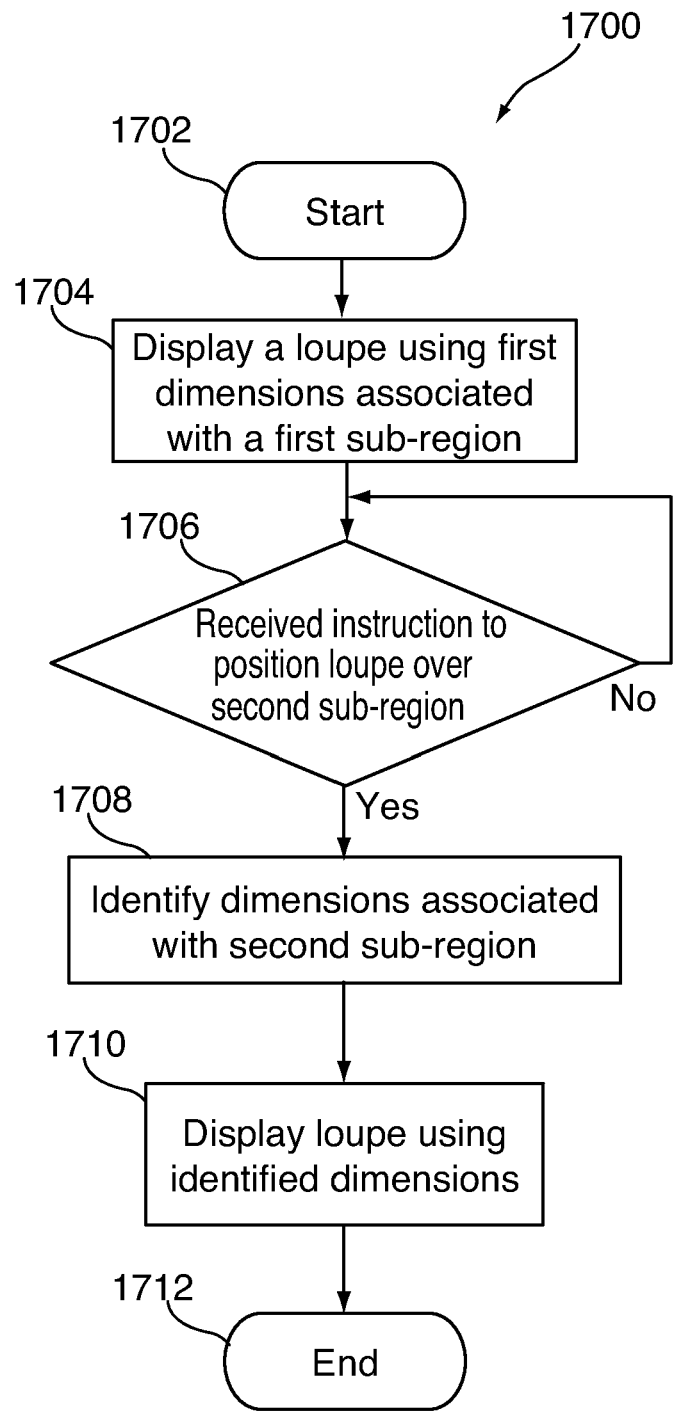
FIG. 17 is a flowchart of an illustrative process for dynamically changing dimensions of a loupe in accordance with some embodiments of the invention.

FIG. 17 is a flowchart of an illustrative process 1700 for dynamically changing dimensions of a loupe in accordance with some embodiments of the invention. Process 1700 can begin at step 1702. At step 1704, a loupe can be displayed using dimensions associated with a first sub-region of a document being displayed. For example, an electronic device can display a loupe having a particular size that may be at least partially determined from at least one dimension of a first sub-region associated with the loupe. In some cases, the loupe can be displayed in a region of the display such that the loupe does not overlap with the first sub-region. At step 1706, the electronic device can determine whether an instruction to associate the loop with a second sub-region was received. For example, the electronic device can determine whether a user provided an instruction to displace the loupe or otherwise associate the contents of the loupe with another sub-region of a displayed document. If the electronic device determines that no instruction was provided, process 1700 can return to step 1706. Alternatively, if the electronic device determines that an instruction to associate the loupe with a second sub-region was received, process 1700 can move to step 1708. At step 1708, at least one dimension associated with the second sub-region can be identified. For example, at least one of a width and a height corresponding to a width and a height of the second sub-region can be identified. At step 1710, the display of the loupe can be reconfigured based on the one or more identified dimensions of the new sub-region. For example, the electronic device can alter the width of the loupe based on an identified width of a new sub-region to be associated with the loupe. In some cases, the loupe can be displayed in a region of the display such that the loupe does not overlap with the second sub-region. Process 1700 can end at step 1712.

Figure 18:
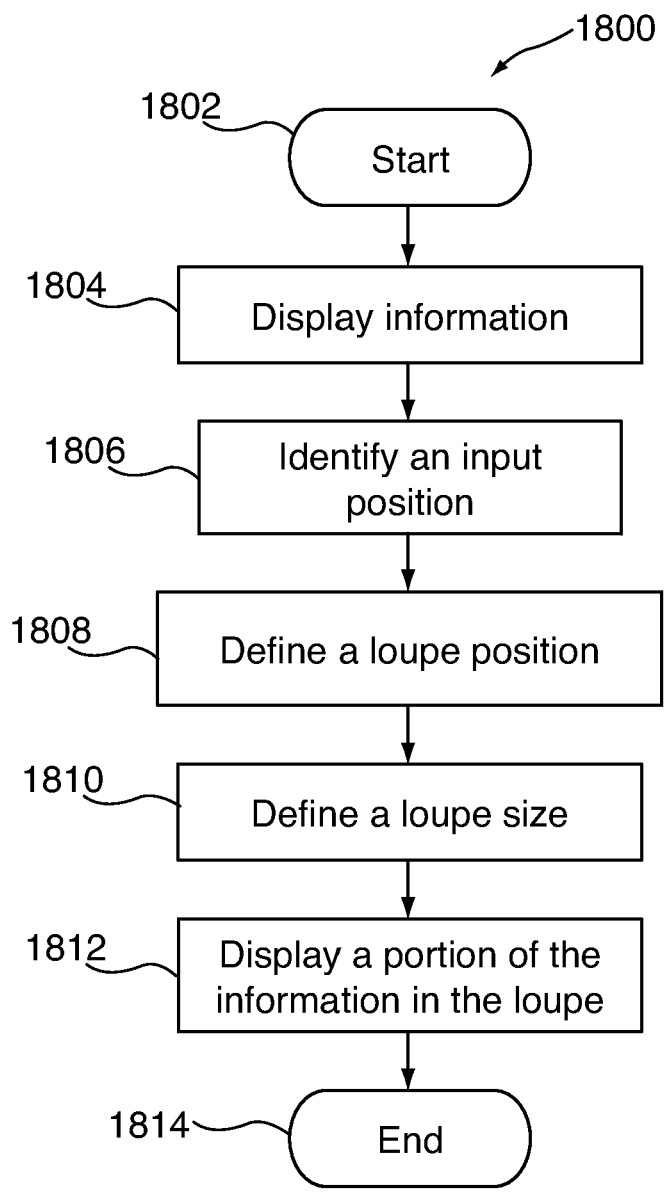
FIG. 18 is a flowchart of an illustrative process for displaying a loupe overlaid on displayed information in accordance with some embodiments of the invention.
Figure 19A:
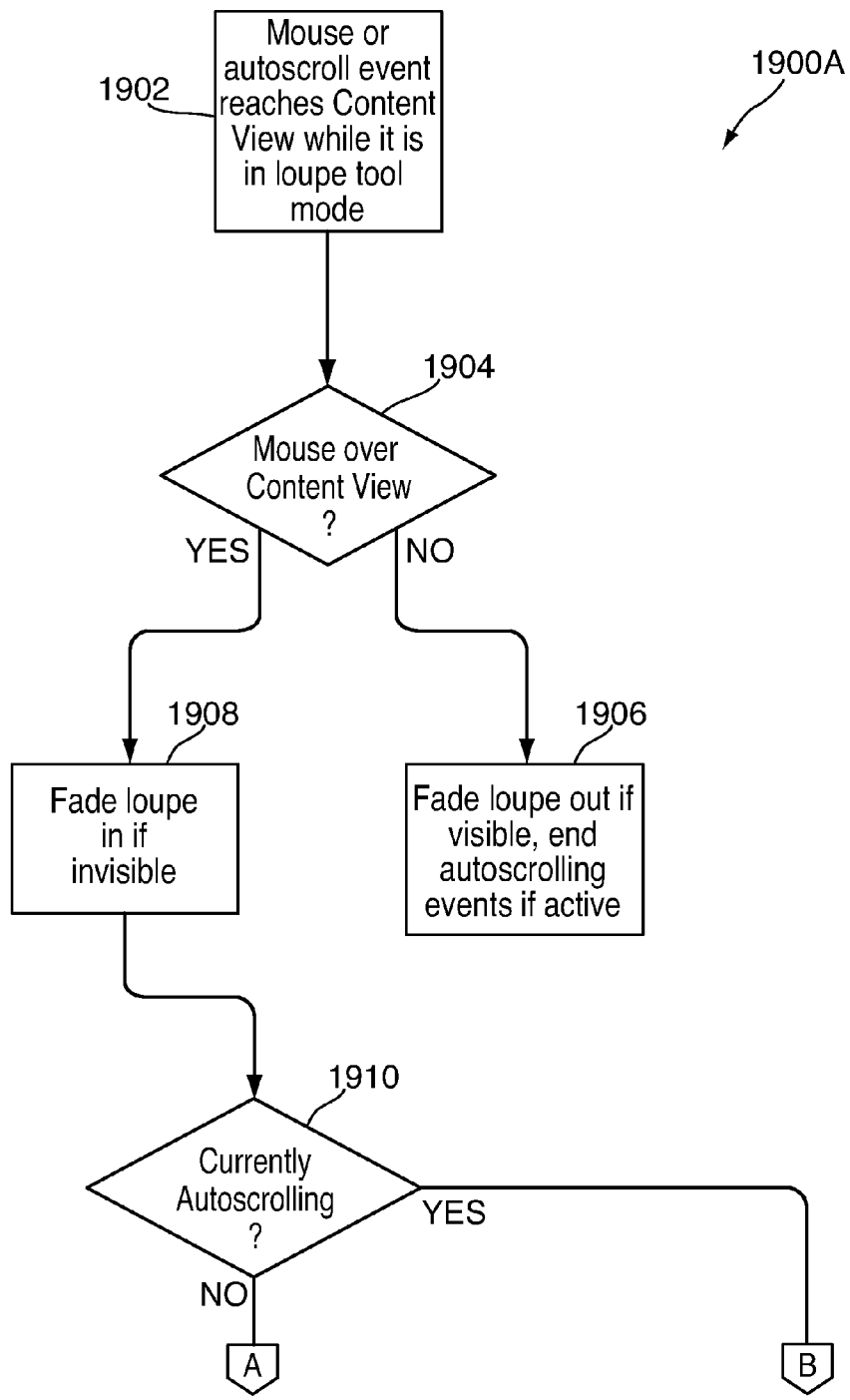
FIGS. 19A-19D are a flowchart of an illustrative process for positioning, displaying, and displacing a loupe that may be displayed by an electronic device in accordance with some embodiments of the invention.
Figure 19B:
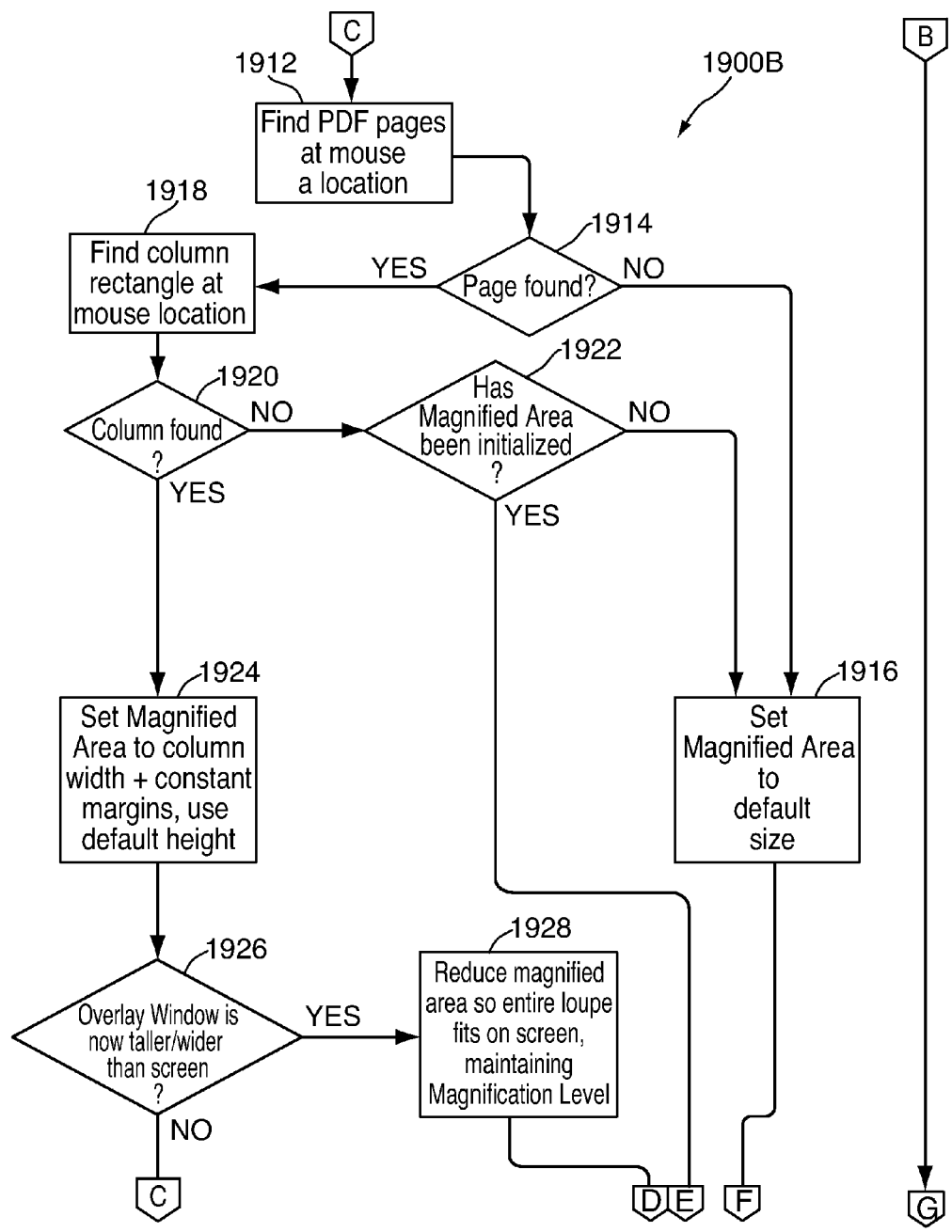
Figure 19C:
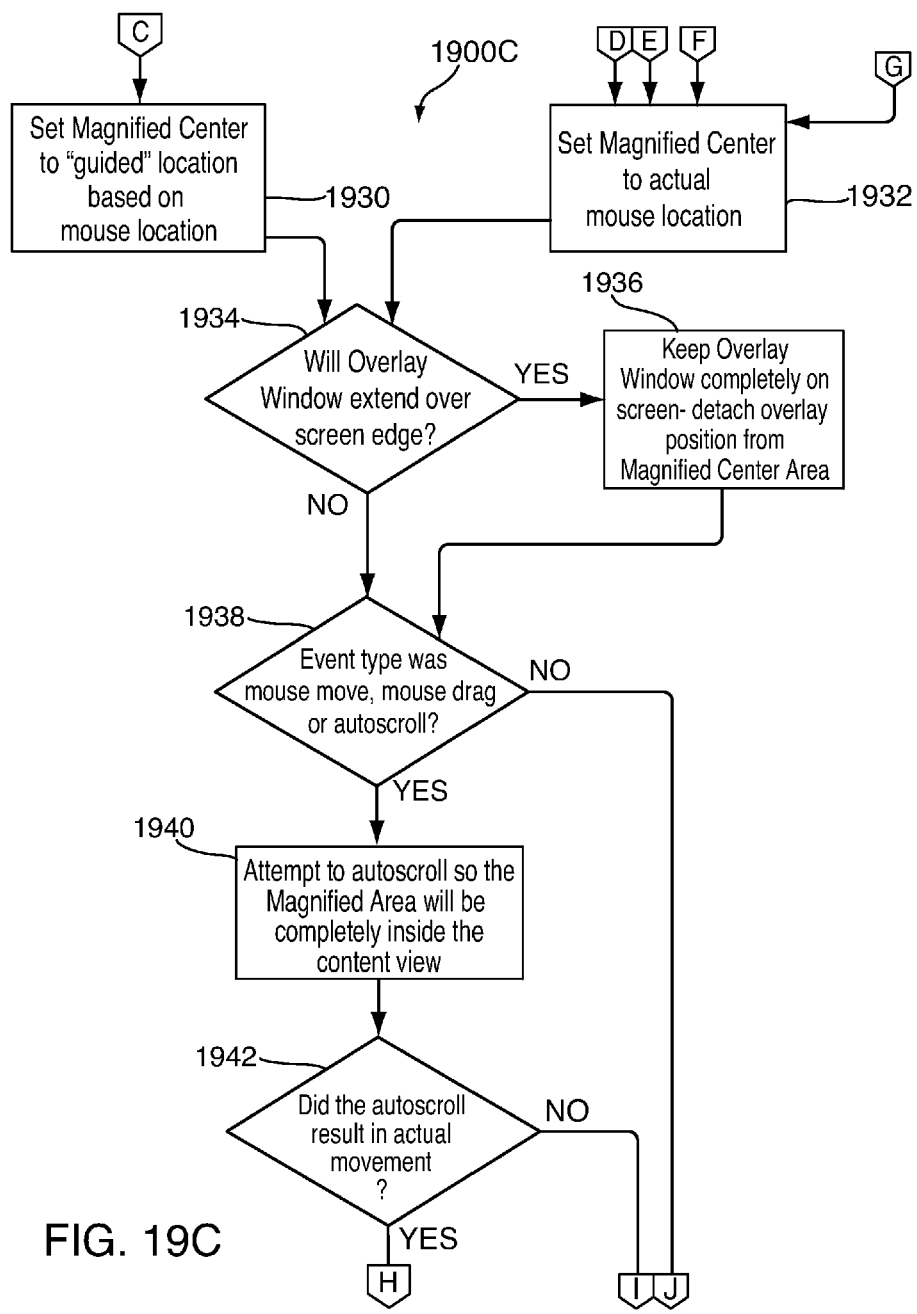
Figure 19D:
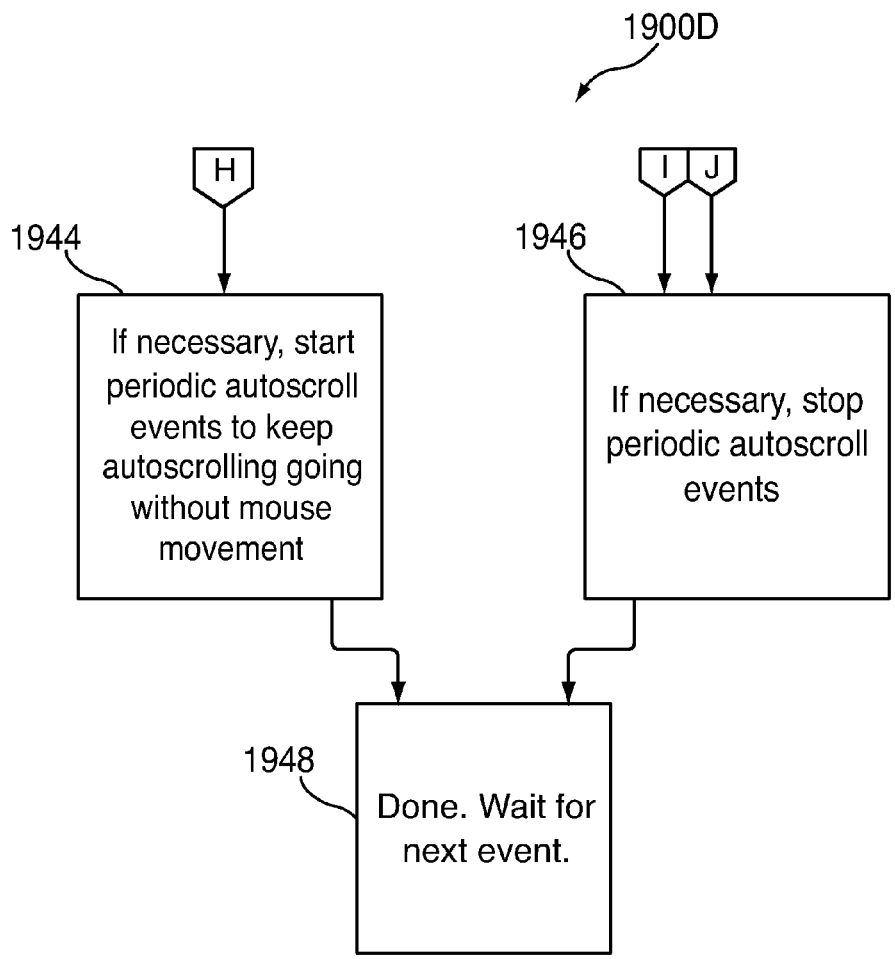

FIG. 18 is a flowchart of an illustrative process 1800 for displaying a loupe overlaid on displayed information of a document. Process 1800 can begin at step 1802. At step 1804, information from several sub-regions of a document can be displayed. At step 1806, a user input position can be identified. For example, an electronic device can identify a cursor position, or identify a position of a touch input. The electronic device can also identify a particular sub-region with which the input position is associated. For example, in some embodiments, the input position may be associated with a sub-region that is displayed at the same location as the identified user input on the display. At step 1808, a loupe position can be defined. The loupe position can correspond to or be associated with the identified input position. In some cases, the loupe position and the input position can have a non-linear relationship (e.g., the loupe position can be determined by applying a power function to the input position). At step 1810, a loupe size may be defined. For example, the loupe size may be defined based on at least one dimension of the sub-region identified to be associated with the loupe. For example, the electronic device can select a loupe width that is larger than the sub-region width, and a loupe height that is less than the sub-region height. In some cases, the loupe size can be defined based on a loupe scale factor used to display information in the loupe and at least one dimension of the associated sub-region. At step 1812, a loupe having the determined loupe size can be displayed at the determined loupe position. The loupe can display information based on one or more of the position of the loupe, the loupe size, and the scale factor used for the loupe. Process 1800 can end at step 1814.

FIGS. 19A-19D is a flowchart of an illustrative process 1900 for positioning, displaying, and displacing a loupe in accordance with some embodiments of the invention. Process 1900 can begin at step 1902 where a mouse or auto-scroll event reaches or calls a content view while it is in loupe tool mode. An auto-scroll event can include automatically scrolling the display as a user provides an input towards a boundary of a document. At step 1904, it may be determined whether mouse view is over content view. The mouse view can correspond to an input position, and can determine whether it is over information (e.g., provided by the content view). Content view can provide information for display by the device. If no, process 1900 may proceed to step 1906 and the loupe may fade out if it is visible, and the auto-scrolling event may end if it is active. For example, the electronic device can fade out a loupe to remove it from the display. In some cases, process 1900 can end. If yes, process 1900 may proceed to step 1908, and the loupe may fade in if it is invisible. At step 1910, it may be determined whether a display is currently auto-scrolling (e.g., as shown in FIGS. 11A-11E). In some cases, an auto-scrolling event can occur without a new user input (e.g., if the user places a mouse to the bottom of a window). If yes, process 1900 can move to step 1932 described below. If no, process 1900 can move to step 1912, where a PDF page at the mouse location can be found (e.g., a document page at an input position may be found). At step 1914, it can be determined whether a document page is found. If no, process 1900 can move to step 1916 and a magnified area can be set to a default size, and process 1900 can move to step 1932 described below.

The magnified area can include the area and amount of information of the content view that is to be displayed in the loupe.

If, at step 1914, it is instead determined that a page is found, process 1900 can move to step 1918. At step 1918, a column rectangle at a mouse location can be found (e.g., at an input position). At step 1920, it can be determined whether a document column is found within the column rectangle. The column rectangle can correspond to boundaries of a sub-region. The electronic device can determine whether a user input is over a sub-region, or over an area between or around sub-regions. If no, process 1900 can move to step 1922 and it may be determined whether a magnified area has been initialized. If yes, process 1900 can move to step 1932 described below. If no, process 1900 can move to step 1916 described above. If, at step 1920, the it is instead determined that a column was found, process 1900 can move to step 1924 and a magnified area can be set to the column width of the found column plus constant margins, and a default height may be used. The constant margins can be determined from a loupe scale factor. At step 1926, it can be determined whether an overlay window is taller or wider than the screen. The overlay window can provide a window in which the loupe is displayed. If yes, process 1900 can move to step 1928 and may reduce the magnified area so that the entire loupe (e.g., in the overlay window) fits on the screen while maintaining a particular magnification level. For example, the electronic device can reduce the amount of information displayed in the loupe while maintaining the loupe scale factor. Process 1900 can then move to step 1932 described below. If no, process 1900 can move to step 1930. At step 1930, a magnified center can be set to a guided location based on the mouse or input location. For example, the electronic device can determine a loupe position based on an input position (e.g., as described in connection with FIGS. 6-8. Process 1900 can then move to step 1934. At step 1932, the magnified center can be set to the actual mouse location, and process 1900 can move to step 1934.

At step 1934, it can be determined whether the overlay will extend over the screen edge. The screen edge can include a boundary of content displayed in a window (e.g., boundary 306, FIG. 3A), a boundary of a window (e.g., a boundary of window 304, FIG. 3), or a boundary of the physical display. If yes, process 1900 can move to step 1936 and keep the overlay window completely on the screen by detaching the overlay position from the magnified center. For example, the electronic device can redefine a loupe position to re-position the loupe. Process 1900 can then move to step 1938. If no, process 1900 can move to step 1938. At step 1938, an event type of a user input can be determined (e.g., as a mouse move, mouse drag, or an auto-scroll). If an event type is not determined to be of a particular type, process 1900 can move to step 1946 described below. If yes, process 1900 can move to step 1940 and attempt to auto-scroll so that the magnified area will be completely inside the content view. For example, the electronic device can scroll the displayed information such that the portion of information within the loupe is within boundaries of a visible region of the information. At step 1942, it can be determined whether an auto-scroll resulted in actual movement (e.g., whether there is additional information that can be displayed as part of the auto-scroll process). If yes, process 1900 can move to step 1944 and can, if necessary, start a periodic auto-scroll event to keep auto-scrolling going without user input (e.g., without mouse movement). For example, the electronic device can determine whether additional information is available in a direction of scrolling.

Process 1900 can then move to step 1948 and end (e.g., wait for a new event, such as a new user input event). If no, process 1900 can move to step 1946 and can, if necessary, stop periodic auto-scroll events. At step 1948, the process can finish and wait for a next event.

In some embodiments, one or more modules of FIG. 1 (e.g., loupe overlay module 130 and/or loupe view module 140) can make use of one or more application programming interfaces ("APIs") in an environment with calling program code that may interact with other program code that may be called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API may be an interface implemented by a program code component (e.g., an "API-implementing component") that may allow a different program code component (e.g., an "API-calling component") to access and use one or more functions, methods, procedures, data structures, classes, and/or other services provided by the API-implementing component. An API can define one or more parameters that are passed between the API-calling component and the API-implementing component.

An API can allow a developer of an API-calling component, which may be a third party developer, to leverage specified features provided by one or more API-implementing components. An API can be a source code interface that a computer system or program library may provide in order to support requests for services from an application. An API can be specified in terms of a programming language that can be interpreted or compiled when an application is built.

In some embodiments, the API-implementing component may provide more than one API each providing a different view of or with different aspects that access different aspects of the functionality implemented by the API-implementing component. In other embodiments, the API-implementing component may itself call one or more other components via an underlying API and thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations, which may be embodied, for example, by function or method calls, that may be exposed by the API and may pass data and control information using parameters via the API calls or invocations. The API-implementing component may return a value through the API in response to an API call from an API-calling component. While the API may define the syntax and result of an API call (e.g., how to invoke the API call and what the API call does), the API may not reveal how the API call accomplishes the function specified by the API call. Various API calls may be transferred via the one or more application programming interfaces between the calling component (e.g., the API-calling component) and an API-implementing component. Transferring the API calls may include issuing, initiating, invoking, calling, receiving, returning, or responding to the function calls or messages. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may be an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that can respond to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component. Thus, the API may include features for translating calls and returns between the API-implementing component and the API-calling component. However, the API may be implemented in terms of a specific programming language.

Figure 20:
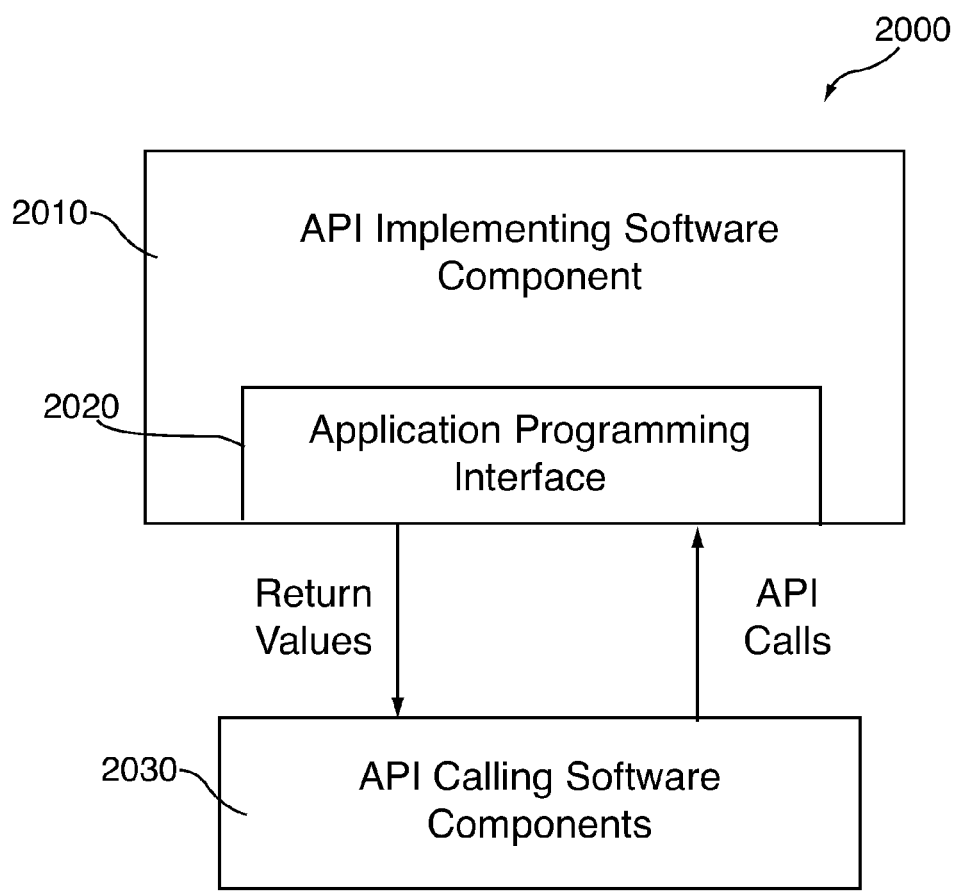
FIG. 20 is a block diagram of an illustrative application program interface ("API") architecture in accordance with some embodiments of the invention.

FIG. 20 is a block diagram illustrating an exemplary API architecture in accordance with some embodiments of the invention. As shown in FIG. 20, API architecture 2000 can include API-implementing component 2010 (e.g., an operating system, a library, a device driver, an API, an application program, or other module) that may implement API 2020. API 2020 can specify one or more functions, methods, classes, objects, protocols, data structures, formats and/or other features of the API-implementing component that may be used by API-calling component 2030. API 2020 can specify at least one calling convention that may specify how a function in the API-implementing component receives parameters from the API-calling component and how the function returns a result to the API-calling component. API-calling component 2030 (e.g., an operating system, a library, a device driver, an API, an application program, or other module), may make API calls through API 2020 to access and use the features of API-implementing component 2010 that are specified by API 2020. API-implementing component 2010 may return a value through the API 2020 to API-calling component 2030 in response to an API call.

Figure 21:
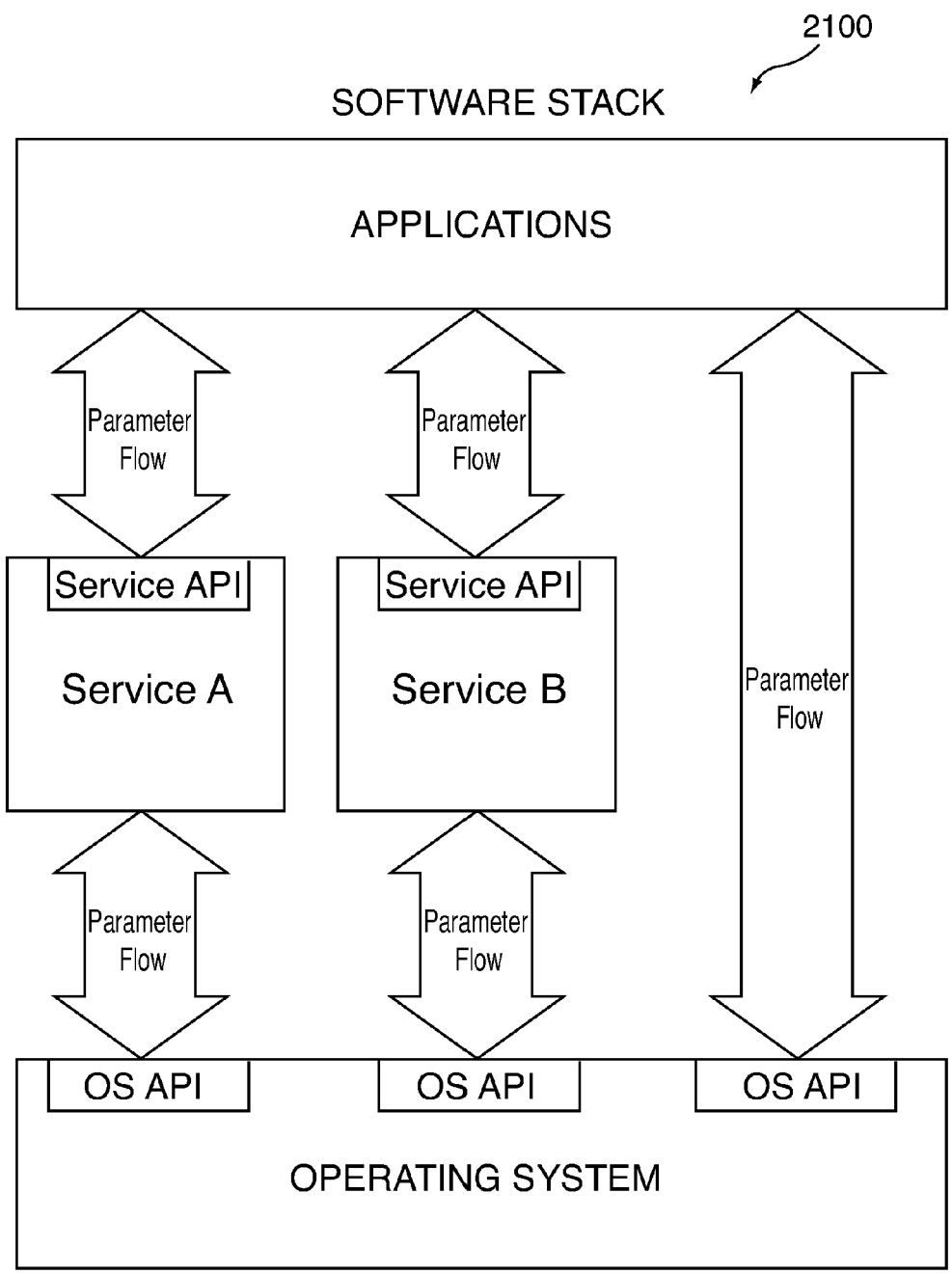
FIG. 21 is a schematic view of illustrative device applications using API calls in accordance with some embodiments of the invention.

It will be appreciated that API-implementing component 2010 can include additional functions, methods, classes, data structures, and/or other features that may not be specified through API 2020 and that may not be available to the API-calling component 2030. It should be understood that API-calling component 2030 may be on the same system as API-implementing component 2010 or may be located remotely and accesses API-implementing component 2010 using API 2020 over a network. While FIG. 20 illustrates a single API-calling component 2030 interacting with API 2020, it should be understood that other API-calling components, which may be written in different languages than or in the same language as API-calling component 2030, may use API 2020. In FIG. 21, in an exemplary embodiment of a "Software Stack" 2100, applications can make calls to Services A or B using Service API and to Operating System ("OS") using OS API. Services A and B can make calls to the OS using OS API.

Figure 22:
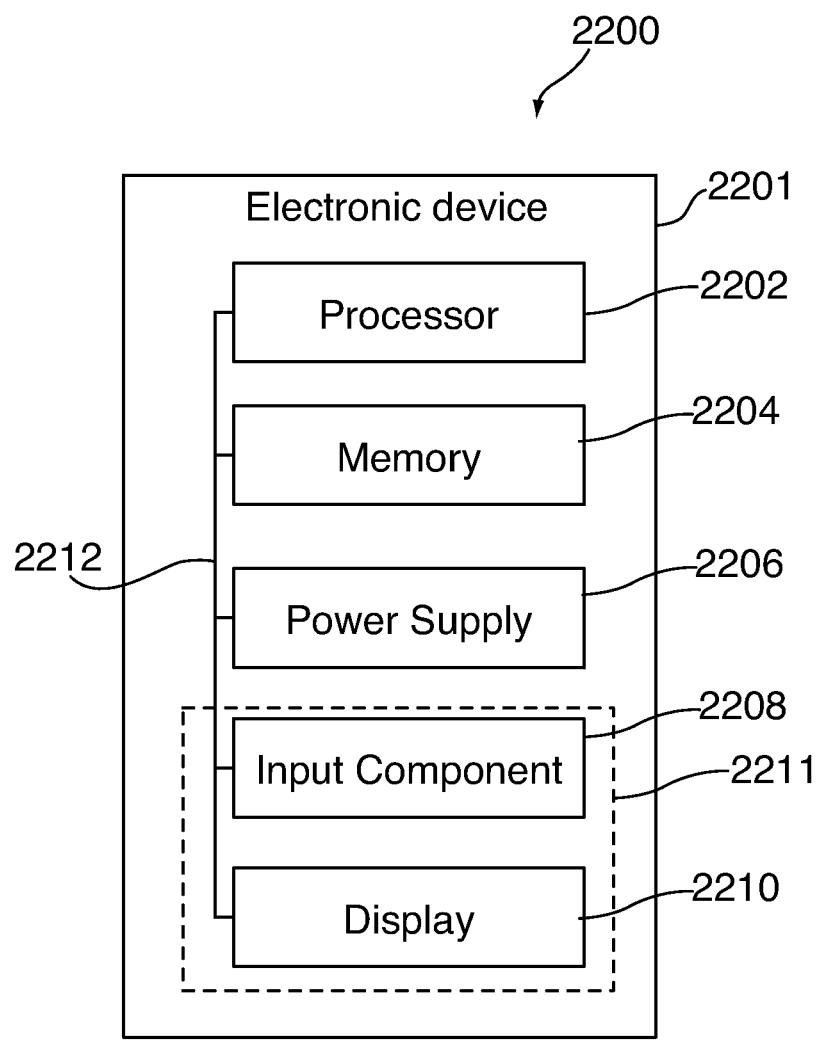
FIG. 22 is a schematic view of an illustrative electronic device for displaying a loupe in accordance with some embodiments of the invention.

Any suitable electronic device can be used to display information in a window using a scale factor. FIG. 22 is a schematic view of an illustrative electronic device 2200 for displaying information in a window in accordance with some embodiments of the invention. Electronic device 2200 may be any portable, mobile, or hand-held electronic device configured to present a document and a loupe to a user wherever the user travels. Alternatively, electronic device 2200 may not be portable at all, but may instead be generally stationary. Electronic device 2200 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 2200 may perform a single function (e.g., a device dedicated to presenting visual content) and, in other embodiments, electronic device 2200 may perform multiple functions (e.g., a device that presents visual content, plays music, and receives and transmits telephone calls).

Electronic device 2200 may include a processor 2202, memory 2204, power supply 2206, input component 2208, and display 2210. Electronic device 2200 may also include a bus 2212 that may provide one or more wired or wireless communication links or paths for transferring data and/or power to, from, or between various other components of device 2200. In some embodiments, one or more components of electronic device 2200 may be combined or omitted. Moreover, electronic device 2200 may include other components not combined or included in FIG. 22 and/or several instances of one or more of the components shown in FIG. 22.

Memory 2204 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 2204 may include cache memory, which may be one or more different types of memory used for temporarily storing data for electronic device application programs. Memory 2204 may store media data (e.g., music and image files), software (e.g., a boot loader program, one or more application programs of an operating system for implementing functions on device 2200, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 2200 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 2206 may provide power to one or more of the components of device 2200. In some embodiments, power supply 2206 can be coupled to a power grid (e.g., when device 2200 is not a portable device, such as a desktop computer). In some embodiments, power supply 2206 can include one or more batteries for providing power (e.g., when device 2200 is a portable device, such as a cellular telephone). As another example, power supply 2206 can be configured to generate power from a natural source (e.g., solar power using solar cells).

One or more input components 2208 may be provided to permit a user to interact or interface with device 2200. For example, input component 2208 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 2208 can be configured to provide one or more dedicated control functions for making selections or issuing commands associated with operating device 2200.

Electronic device 2200 may also include one or more output components that may present information (e.g., visual, audible, and/or tactile information) to a user of device 2200. An output component of electronic device 2200 may take various forms, including, but not limited to, audio speakers, headphones, audio line-outs, visual displays, antennas, infrared ports, rumblers, vibrators, or combinations thereof.

For example, electronic device 2200 may include display 2210 as an output component. Display 2210 may include any suitable type of display or interface for presenting visual content to a user. In some embodiments, display 2210 may include a display embedded in device 2200 or coupled to device 2200 (e.g., a removable display). Display 2210 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 2210 can include a movable display or a projecting system for providing a display of content on a surface remote from electronic device 2200, such as, for example, a video projector, a head-up display, or a three-dimensional (e.g., holographic) display. As another example, display 2210 may include a digital or mechanical viewfinder, such as a viewfinder of the type found in compact digital cameras, reflex cameras, or any other suitable still or video camera. In some embodiments, display 2210 may include display driver circuitry, circuitry for driving display drivers, or both. Display 2210 can be operative to present visual content provided by device 2200 (e.g., a document and a loupe).

It should be noted that one or more input components and one or more output components may sometimes be referred to collectively herein as an input/output ("I/O") interface (e.g., input component 2208 and display 2210 as I/O interface 2211). It should also be noted that input component 2208 and display 2210 may sometimes be a single I/O component, such as a touch screen that may receive input information through a user's touch of a display screen and that may also provide visual information to a user via that same display screen.

Electronic device 2200 may also be provided with an enclosure or housing 2201 that may at least partially enclose one or more of the components of device 2200 for protecting them from debris and other degrading forces external to device 2200. In some embodiments, one or more of the components may be provided within its own housing (e.g., input component 2208 may be an independent keyboard or mouse within its own housing that may wirelessly or through a wire communicate with processor 2202, which may be provided within its own housing).

Processor 2202 of device 2200 may include any processing or control circuitry operative to control the operations and performance of one or more components of electronic device 2200. For example, processor 2202 may be used to run operating system applications, firmware applications, media playback applications, media editing applications, or any other application. In some embodiments, processor 2202 may receive input signals from input component 2208 and/or drive output signals through display 2210.

It is to be understood that the steps shown in each one of processes 1200-1900 of FIGS. 12-19D, respectively, are merely illustrative and that existing steps may be modified or omitted, additional steps may be added, and the order of certain steps may be altered.

Moreover, the processes described with respect to FIGS. 12-19D, as well as any other aspects of the invention, may each be implemented in hardware or a combination of hardware and software. Embodiments of the invention can also be embodied as computer-readable code on a computer-readable medium. The computer-readable medium may be any data storage device that can store data which can thereafter be read by a computer system. Examples of the computer-readable medium include read-only memory ("ROM"), random-access memory ("RAM"), CD-ROMs, DVDs, magnetic tape, and optical data storage devices. The computer-readable medium can also be distributed over network-coupled computer systems so that the computer-readable code may be stored and executed in a distributed fashion.

Although many of the embodiments of the present invention are described herein with respect to personal computing devices, it should be understood that the present invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for providing a dynamic loupe in a window of an electronic device comprising:
   displaying information from a document in the window of the electronic device, wherein the information of the document is displayed at an information scale factor;
   receiving an instruction to display the dynamic loupe over a portion of the information of the document, the instruction including a current input position on the document;
   defining a loupe position corresponding to the current input position on the document;
   displaying the dynamic loupe at the loupe position on the document, wherein the portion of the information of the document is displayed within the dynamic loupe at a first loupe scale factor;
   receiving an instruction for adjusting the information scale factor of the displayed information to generate an adjusted information scale factor;
   determining, in response to the instruction for adjusting the information scale factor, a second loupe scale factor for the dynamic loupe based on the adjusted information scale factor and a predetermined relationship between a particular information scale factor and a loupe scale factor, wherein the second loupe scale factor is different than the first loupe scale factor; and
   simultaneously adjusting, in response to the instruction for adjusting the information scale factor, the first loupe scale factor to the second loupe scale factor while the displayed information is displayed at the adjusted information scale factor.

2. The method of claim 1, further comprising:
   adjusting, in response to the instruction for adjusting the information scale factor, a size of the dynamic loupe to generate an adjusted loupe size.

3. The method of claim 1, further comprising:
   displaying the information from the document at the adjusted information scale factor; and
   displaying the portion of the information within the dynamic loupe at the second loupe scale factor, wherein the first and second loupe scale factors are different.

4. The method of claim 1, further comprising:
   displaying the information from the document at the adjusted information scale factor; and
   displaying the portion of the information within the dynamic loupe at the second loupe scale factor, wherein the first and second loupe scale factors are the same.

5. The method of claim 1, wherein adjusting the information scale factor comprises increasing the information scale factor.

6. The method of claim 5, further wherein the second loupe scale factor is larger than the first loupe scale factor.

7. The method of claim 6, further comprising:
   displaying the information from the document at the increased information scale factor; and
displaying the portion of the information within the dynamic loupe at the second loupe scale factor.

8. The method of claim 1, wherein adjusting the information scale factor comprises decreasing the information scale factor.

9. The method of claim 8, further wherein the second loupe scale factor is smaller than the first loupe scale factor.

10. The method of claim 9, further comprising:
displaying the information of the document at the decreased information scale factor; and
displaying the portion of the information within the dynamic loupe at the second loupe scale factor.

11. A non-transitory computer-readable medium comprising instruction stored thereon, which when executed by at least one processor, configure the at least one processor to perform operations comprising:
displaying information from a document in a window of an electronic device, wherein the information of the document is displayed at an information scale factor;
receiving an instruction to display a dynamic loupe over a portion of the information of the document, the instruction including a current input position on the document;
defining a loupe position corresponding to the current input position on the document;
displaying the dynamic loupe at the loupe position on the document, wherein a portion of the information of the document is displayed within the dynamic loupe at a first loupe scale factor;
receiving an instruction for adjusting the information scale factor of the displayed information to generate an adjusted information scale factor;
determining, in response to the instruction for adjusting the information scale factor, a second loupe scale factor for the dynamic loupe based on the adjusted information scale factor and a predetermined relationship between a particular information scale factor and a loupe scale factor, wherein the second loupe scale factor is different than the first loupe scale factor; and
simultaneously adjusting, in response to the instruction for adjusting the information scale factor, the first loupe scale factor to the second loupe scale factor while the displayed information is displayed at the adjusted information scale factor.

12. The non-transitory computer-readable medium of claim 11, the operations further comprising:
displaying the information from the document at the adjusted information scale factor; and
displaying the portion of the information within the dynamic loupe at the second loupe scale factor, wherein the first and second loupe scale factors are different.

13. The non-transitory computer-readable medium of claim 11, the operations further comprising:
displaying the information from the document at the adjusted information scale factor; and
displaying the portion of the information within the dynamic loupe at the second loupe scale factor, wherein the first and second loupe scale factors are the same.

14. The non-transitory computer-readable medium of claim 11, wherein adjusting the adjusted information scale factor comprises increasing the information scale factor and wherein the second loupe scale factor is larger than the first loupe scale factor and wherein the operations further comprise:
displaying the portion of the information within the dynamic loupe at the second loupe scale factor.

15. The non-transitory computer-readable medium of claim 11, the operations further comprising:
adjusting, in response to the instruction for adjusting the information scale factor, a size of the loupe size to generate an adjusted loupe size.

16. A system for providing a dynamic loupe in a window of an electronic document comprising:
at least one processor;
a storage medium comprising instructions, which when executed by the at least one processor, configure the at least one processor to:
display information from a document in the window of the electronic device, wherein a portion of the information of the document is displayed at an information scale factor;
receive an instruction to display the dynamic loupe over the portion of the information of the document, the instruction including a current input position on the document;
define a loupe position corresponding to the current input position on the document;
display the dynamic loupe at the loupe position on the document, wherein the portion of the information of the document is displayed within the dynamic loupe at a first loupe scale factor;
receive an instruction for adjusting the information scale factor of the displayed information to generate an adjusted information scale factor; and
determine, in response to the instruction for adjusting the information scale factor, a second loupe scale factor for the dynamic loupe based on the adjusted information scale factor and a predetermined relationship between a particular information scale factor and a loupe scale factor, wherein the second loupe scale factor is different than the first loupe scale factor; and
simultaneously adjust, in response to the instruction for adjusting the information scale factor, the first loupe scale factor to the second loupe scale factor while the displayed information is displayed at the adjusted information scale factor.

17. The system of claim 16, wherein the instructions, when executed by the at least one processor, further configure the at least one processor to:
display the information from the document at the adjusted information scale factor; and
display the portion of the information within the dynamic loupe at the second loupe scale factor, wherein the first and second loupe scale factors are different.

18. The system of claim 16, wherein the instructions, when executed by the at least one processor, further configure the at least one processor to:
display the information from the document at the adjusted information scale factor; and
display the portion of the information within the dynamic loupe at the second loupe scale factor, wherein the first and second loupe scale factors are the same.

19. The electronic device system of claim 16,
wherein adjusting the adjusted information scale factor comprises an increase in the information scale factor;
wherein the second loupe scale factor is larger than the first loupe scale factor; and
wherein the portion of the information is displayed within the dynamic loupe at the second loupe scale factor.

20. The system of claim 16, wherein the instructions, when executed by the at least one processor, further configure the at least one processor to:

adjust, in response to the instruction for adjusting the information scale factor, a size of the loupe size to generate an adjusted loupe size.

\* \* \* \* \*